(12) United States Patent
Fang et al.

(10) Patent No.: US 11,979,695 B2
(45) Date of Patent: May 7, 2024

(54) SPI-BASED DATA TRANSMISSION SYSTEM

(71) Applicant: HUAWEI TECHNOLOGIES CO., LTD., Guangdong (CN)

(72) Inventors: Qingyin Fang, Dongguan (CN); Jia Hu, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/069,552

(22) Filed: Dec. 21, 2022

(65) Prior Publication Data

US 2023/0117027 A1 Apr. 20, 2023

Related U.S. Application Data

(63) Continuation of application No. PCT/CN2021/102207, filed on Jun. 24, 2021.

(30) Foreign Application Priority Data

Jun. 28, 2020 (CN) .......................... 202010600781.3

(51) Int. Cl.
*H04N 23/68* (2023.01)
*H04Q 9/00* (2006.01)

(52) U.S. Cl.
CPC ........... *H04Q 9/00* (2013.01); *H04N 23/6812* (2023.01)

(58) Field of Classification Search
None
See application file for complete search history.

(56) References Cited

U.S. PATENT DOCUMENTS

| 9,274,997 | B2 * | 3/2016 | Berenbaum | G06F 13/4256 |
| 2010/0199007 | A1 | 8/2010 | Kapelner | |
| 2014/0115222 | A1 * | 4/2014 | DeCesaris | G06F 13/4054 |
| | | | | 710/313 |
| 2022/0214984 | A1 * | 7/2022 | Lee | G06F 13/24 |
| 2022/0239579 | A1 * | 7/2022 | Boudoux | G06F 13/4291 |
| 2023/0385226 | A1 * | 11/2023 | Wu | G06F 13/4291 |

FOREIGN PATENT DOCUMENTS

| JP | 2001216284 A | 8/2001 |
| JP | 2005141412 A | 6/2005 |
| JP | 2007033624 A | 2/2007 |
| JP | 2014153822 A | 8/2014 |

* cited by examiner

*Primary Examiner* — Cynthia Segura
(74) *Attorney, Agent, or Firm* — WOMBLE BOND DICKINSON (US) LLP

(57) ABSTRACT

An SPI-based data transmission system is provided. In the system, a master SPI apparatus enables a first slave SPI apparatus by using a combination of a first and a second chip select signal. In response to the master SPI apparatus driving the first chip select signal to be in an enable state and driving the second chip select signal to be in a disable state, the master SPI apparatus controls a second slave SPI apparatus to send data using a data line. The master SPI apparatus further receives data by using the data line, and the first slave SPI apparatus receives data using the data line. When the first chip select signal is in the enable state and the second chip select signal is in the disable state, the master SPI apparatus and the first slave SPI apparatus can simultaneously receive data transmitted by the second slave SPI apparatus.

20 Claims, 10 Drawing Sheets

SPI-BASED DATA TRANSMISSION SYSTEM

CROSS-REFERENCE TO RELATED APPLICATIONS

This application is a continuation of International Application No. PCT/CN2021/102207, filed on Jun. 24, 2021, which claims priority to Chinese Patent Application No. 202010600781.3, filed on Jun. 28, 2020. The disclosures of the aforementioned applications are hereby incorporated by reference in their entireties.

TECHNICAL FIELD

This application relates to the field of data transmission technologies, and in particular, to an SPI-based data transmission system.

BACKGROUND

Currently, a camera module supporting optical image stabilization (OIS) includes a motor drive, and each motor drive controls a motor of the camera module based on gyroscope information collected by a gyroscope sensor (GYRO), to implement shake compensation. Using a smartphone as an example, the gyroscope sensor is generally installed on a main board of the smartphone, and the gyroscope sensor and the camera module are connected by using a serial peripheral interface (SPI), to transmit gyroscope information between the gyroscope sensor and the camera module.

When the smartphone includes a plurality of camera modules supporting optical image stabilization, one of the plurality of camera modules serves as a master SPI apparatus, and the gyroscope sensor and another camera module serve as slave SPI apparatuses. The master SPI apparatus can perform data transmission with only one slave SPI apparatus at a time. Therefore, when one camera module obtains gyroscope information from the gyroscope sensor, another camera module delays obtaining gyroscope information from the gyroscope sensor, resulting in an undesired OIS effect.

In conclusion, data transmission efficiency between SPI apparatuses in an SPI system including a plurality of slave SPI apparatuses is not high, resulting in an undesired OIS effect of a camera module serving as a slave SPI apparatus.

SUMMARY

This application provides an SPI-based data transmission system, to improve data transmission efficiency of an SPI system including a plurality of slave SPI apparatuses.

According to a first aspect, this application provides a data transmission system. The system may include a master SPI apparatus, a first slave SPI apparatus, and a second slave SPI apparatus. The master SPI apparatus may be configured to output a first chip select signal to the first slave SPI apparatus and the second slave SPI apparatus, and output a second chip select signal to the first slave SPI apparatus. A combination of the first chip select signal and the second chip select signal is used to enable the first slave SPI apparatus, the first chip select signal is used to enable the second slave SPI apparatus, and the master SPI apparatus, the first slave SPI apparatus, and the second slave SPI apparatus are further connected by using a data line. The master SPI apparatus may be further configured to: when the master SPI apparatus drives the first chip select signal to an enable state and drives the second chip select signal to a disable state, control the second slave SPI apparatus to send data by using the data line, and receive, by using the data line, the data sent by the second slave SPI apparatus. The second SPI apparatus may be configured to: when the master SPI apparatus drives the first chip select signal to the enable state and drives the second chip select signal to the disable state, send the data by using the data line under control of the master SPI apparatus. The first slave SPI apparatus may be configured to: when the master SPI apparatus drives the first chip select signal to the enable state and drives the second chip select signal to the disable state, receive, by using the data line, the data sent by the second slave SPI apparatus.

In the data transmission system, the master SPI apparatus enables the first slave SPI apparatus by using the combination of the first chip select signal and the second chip select signal, and when the master SPI apparatus drives the first chip select signal to the enable state and drives the second chip select signal to the disable state, the master SPI apparatus controls the second slave SPI apparatus to send data by using the data line, the master SPI apparatus may further receive the data by using the data line, and the first slave SPI apparatus may receive the data by using the data line. Therefore, when the first chip select signal is in the enable state and the second chip select signal is in the disable state, the master SPI apparatus and the first slave SPI apparatus can simultaneously receive the data transmitted by the second slave SPI apparatus, thereby improving data transmission efficiency of the SPI system.

In a possible example, if a transmit port of the first slave SPI apparatus is connected to a receive port of the master SPI apparatus by using a first data line, a receive port of the first slave SPI apparatus is connected to a transmit port of the master SPI apparatus by using a second data line, the data line includes the first data line and the second data line, the transmit port of the first slave SPI apparatus and the transmit port of the master SPI apparatus are configured to send data, and the receive port of the first slave SPI apparatus and the receive port of the master SPI apparatus are configured to receive data, the first slave SPI apparatus may be further configured to: when the master SPI apparatus drives the first chip select signal to the enable state and drives the second chip select signal to the disable state, switch the transmit port of the first slave SPI apparatus to the receive port, and switch the receive port of the first slave SPI apparatus to the transmit port.

With this design, in a four-wire mode, when the master SPI apparatus drives the first chip select signal to the enable state and drives the second chip select signal to the disable state, the first slave SPI apparatus may switch the transmit port to the receive port, to receive, by using the data line, the data sent by the second slave SPI apparatus. The first slave SPI apparatus may further switch the receive port to the transmit port, so as not to receive data from the master SPI apparatus, nor respond to a write indication bit sent by the master SPI apparatus, to avoid sending data by using a same data line as the second slave SPI apparatus, so as to avoid a data conflict.

In another possible example, the first slave SPI apparatus may be further configured to configure a data port of the first slave SPI apparatus to a bidirectional data port, and the bidirectional data port supports receiving and sending of data.

With this design, in a three-wire mode, the first slave SPI apparatus sets the data port to the bidirectional data port, to receive, through the data port, the data sent by the second slave SPI apparatus. In addition, the first slave SPI apparatus may further receive, through the data port, data sent by the master SPI apparatus, to further improve data transmission efficiency.

In addition, the master SPI apparatus may be configured to: when the master SPI apparatus drives the first chip select signal to the enable state and drives the second chip select signal to the disable state, send a first indication by using the data line. The first indication is used to control sending of data. Then, the first slave SPI apparatus may be further configured to: when the master SPI apparatus drives the first chip select signal to the enable state and drives the second chip select signal to the disable state, skip sending data in response to the first indication.

With this design, the first slave SPI apparatus does not respond to the first indication from the master SPI apparatus, so that the first slave SPI apparatus and the second slave SPI apparatus do not simultaneously send data by using the data line based on the first indication, to avoid a data conflict.

The master SPI apparatus may be further configured to: when the master SPI apparatus drives the first chip select signal to the disable state and drives the second chip select signal to the enable state, send a second indication and data by using the data line. The second indication is used to control receiving of data. Then, the first slave SPI apparatus may be further configured to: when the master SPI apparatus drives the first chip select signal to the disable state and drives the second chip select signal to the enable state, receive the second indication by using the data line and receive the data by using the data line in response to the second indication.

With this design, when the master SPI apparatus drives the first chip select signal to the disable state and drives the second chip select signal to the enable state, the first slave SPI apparatus may receive the data from the master SPI apparatus based on the second indication.

The master SPI apparatus may be further configured to: when the master SPI apparatus drives the first chip select signal to the disable state and drives the second chip select signal to the enable state, send a first indication by using the data line and receive data from the first slave SPI apparatus by using the data line. The first indication is used to control sending of data. Then, the first slave SPI apparatus may be further configured to: when the master SPI apparatus drives the first chip select signal to the disable state and drives the second chip select signal to the enable state, receive the first indication by using the data line and send the data by using the data line in response to the first indication.

With this design, when the master SPI apparatus drives the first chip select signal to the disable state and drives the second chip select signal to the enable state, the first slave SPI apparatus may send the data to the master SPI apparatus based on the first indication.

In addition, the first slave SPI apparatus may be further configured to: when the master SPI apparatus drives the first chip select signal to the disable state and drives the second chip select signal to the disable state, skip sending data by using the data line, and skip receiving data by using the data line.

With this design, when the master SPI apparatus drives the first chip select signal to the disable state and drives the second chip select signal to the disable state, the first slave SPI apparatus may not read data in response to a read indication bit sent by the master SPI apparatus. In addition, the first slave SPI apparatus does not send data in response to a write indication bit sent by the master SPI apparatus, to avoid a data transmission conflict on the data line.

According to a second aspect, this application provides a chip. The chip may be used in the first slave SPI apparatus according to the first aspect.

For example, the chip may include components such as an SPI controller, an SPI control logic unit (or referred to as an SPI control logic circuit), an SPI data receiving/sending switching unit (or referred to as an SPI data receiving/sending switching circuit), and an SPI data port (or referred to as a data port).

The SPI control logic circuit may be configured to receive a first chip select signal and a second chip select signal from a master SPI apparatus. A combination of the first chip select signal and the second chip select signal is used to enable the chip. The SPI data port may be connected to the master SPI apparatus and a second slave SPI apparatus by using a data line. The SPI control logic circuit may be configured to: when the master SPI apparatus drives the first chip select signal to an enable state and drives the second chip select signal to a disable state, control the SPI controller to receive, through the SPI data port, data sent by the second slave SPI apparatus on the data line.

In some embodiments, the SPI data port may include a transmit port and a receive port, the transmit port is connected to a receive port of the master SPI apparatus by using the data line, the receive port is connected to a transmit port of the master SPI apparatus by using the data line, the transmit port is configured for the chip to send data to the data line, and the receive port is configured for the chip to receive data transmitted on the data line. The SPI control logic circuit may be further configured to: when the master SPI apparatus drives the first chip select signal to the enable state and drives the second chip select signal to the disable state, configure the transmit port to receive data transmitted on the data line.

The chip may further include the SPI data receiving/sending switching circuit. The SPI controller may include a sending module and a receiving module. The sending module is configured to send data, and the receiving module is configured to receive data. The SPI control logic circuit may be further configured to: when the master SPI apparatus drives the first chip select signal to the enable state and drives the second chip select signal to the disable state, control the SPI data receiving/sending switching circuit to connect the transmit port to the receiving module.

The SPI control logic circuit may be further configured to configure the SPI data port to a bidirectional data port, and the bidirectional data port supports receiving and sending of data.

The SPI control logic circuit may be further configured to: when the master SPI apparatus drives the first chip select signal to the enable state and drives the second chip select signal to the disable state, control the SPI controller not to send data in response to a first indication transmitted by the data line. The first indication is used to control sending of data.

The SPI control logic circuit may be further configured to: when the master SPI apparatus drives the first chip select signal to the disable state and drives the second chip select signal to the enable state, control the SPI controller to receive, through the SPI data port, data transmitted on the data line. The SPI controller may be further configured to: when the master SPI apparatus drives the first chip select signal to the disable state and drives the second chip select signal to the enable state, receive a second indication transmitted on the data line, where the second indication is used to control receiving of data; and receive, in response to the second indication through the SPI data port, data transmitted on the data line.

The SPI control logic circuit may be further configured to: when the master SPI apparatus drives the first chip select signal to the disable state and drives the second chip select signal to the enable state, control the SPI controller to receive, through the SPI data port, data transmitted on the data line. The SPI controller may be further configured to: when the master SPI apparatus drives the first chip select signal to the disable state and drives the second chip select signal to the enable state, receive a first indication transmitted on the data line, where the first indication is used to control sending of data; and send data to the data line through the SPI data port in response to the first indication.

The SPI control logic circuit may be further configured to: when the master SPI apparatus drives the first chip select signal to the disable state and drives the second chip select signal to the disable state, control the SPI controller not to send data by using the data line, and control the SPI controller not to receive data by using the data line.

The SPI controller, the SPI control logic circuit, the SPI data receiving/sending switching circuit, and the SPI data port may be implemented by an integrated circuit.

According to a third aspect, this application provides a camera module. The camera module may include the chip according to any one of the second aspect or the designs of the second aspect, and the camera module may have functions of the chip according to any one of the second aspect or the designs of the second aspect. The camera module may further include a motor and a camera. When a second slave SPI apparatus includes a gyroscope sensor, the motor may be configured to obtain data of the gyroscope sensor from the chip to perform shake control and/or auto focus (AF) of the camera.

According to a fourth aspect, this application provides a terminal device. The terminal device may include the data transmission system according to any one of the first aspect or the designs of the first aspect. Therefore, the terminal device may have the functions according to any one of the first aspect or the designs of the first aspect.

Alternatively, the terminal device may include the chip according to any one of the second aspect or the designs of the second aspect. Therefore, the terminal device may have functions of the chip according to any one of the first aspect or the designs of the first aspect.

Alternatively, the terminal device may include the camera module according to the third aspect. Therefore, the terminal device may have functions of the chip according to any one of the second aspect or the designs of the second aspect. In this case, the terminal device may be a photographing device. The terminal device may further include an image processing chip that may perform image signal processing (ISP), configured to obtain an image signal from the camera module, and process the image signal, for example, perform high definition processing on the image signal output by the camera module.

According to a fifth aspect, this application provides a data transmission system. The system may include a first camera, a second camera, and a first sensor. The first camera, the second camera, and the first sensor communicate with each other by using an SPI protocol. The first camera is a master SPI device, and the second camera and the first sensor are slave SPI devices. When the first camera and the second camera run simultaneously, the first camera obtains first sensor data by using the SPI protocol, and the second camera obtains the first sensor data by using the SPI protocol at the same time.

With the data transmission system, the first camera and the second camera can simultaneously obtain the first sensor data, thereby reducing a delay in obtaining the sensor data by the camera, and improving an OIS effect of a camera module.

In a possible design, the first camera may output a first chip select signal to the second camera and the first sensor, and output a second chip select signal to the second camera and the first sensor. A state combination of the first chip select signal and the second chip select signal is used to control whether to enable the second camera and is used to control whether to enable the first sensor. The first camera, the second camera, and the first sensor are further connected by using a data line. When the first chip select signal is in an enable state and the second chip select signal is in a disable state, the first camera may control the second camera to send data by using the data line, and receive, by using the data line, the data sent by the second camera, the first sensor may send data by using the data line under control of the first camera, and the second camera may receive, by using the data line, the data sent by the first sensor to the first camera.

With this design, the first camera can flexibly control work states of the second camera and the first sensor by using the first chip select signal and the second chip select signal. When the second camera and the first sensor are in a working state (or referred to as an enabled state), the first camera and the second camera can simultaneously obtain the data of the first sensor, thereby improving data transmission efficiency.

In a possible design, the first camera may output a first chip select signal to the second camera and the first sensor, and output a second chip select signal to the second camera and the first sensor. A state combination of the first chip select signal and the second chip select signal is used to control whether to enable the second camera and is used to control whether to enable the first sensor. The first camera, the second camera, and the first sensor are further connected by using a data line. When the first chip select signal and the second chip select signal are in a preset state combination (for example, the first chip select signal is in an enable state and the second chip select signal is in a disable state, or in another state combination), the first camera may control the second camera to send data by using the data line, and receive, by using the data line, the data sent by the second camera, the first sensor may send data by using the data line under control of the first camera, and the second camera may receive, by using the data line, the data sent by the first sensor to the first camera.

With this design, the first camera can flexibly control work states of the second camera and the first sensor by using the first chip select signal and the second chip select signal. When the second camera and the first sensor are in a working state (or referred to as an enabled state), the first camera and the second camera can simultaneously obtain the data of the first sensor, thereby improving data transmission efficiency.

In a possible design, the first camera may send data to the second camera by using the data line, the first sensor may receive, by using the data line, the data sent by the first camera, and the second camera may receive, by using the data line, the data sent by the first camera to the first sensor.

With this design, the first camera can flexibly control work states of the second camera and the first sensor by using the first chip select signal and the second chip select signal. When the second camera and the first sensor are in a working state (or referred to as an enabled state), the second camera and the first sensor can simultaneously obtain the data of the first camera, thereby improving data transmission efficiency.

In a possible design, if a transmit port of the second camera is connected to a receive port of the first camera by using a first data line, a receive port of the second camera is connected to a transmit port of the first camera by using a second data line, the data line includes the first data line and the second data line, the transmit port of the second camera and the transmit port of the first camera are configured to send data, and the receive port of the second camera and the receive port of the first camera are configured to receive data, when the first chip select signal is in the enable state and the second chip select signal is in the disable state, or when the first chip select signal and the second chip select signal are in the preset state combination, the second camera may further switch the transmit port of the second camera to the receive port, and switch the receive port of the second camera to the transmit port.

With this design, in a four-wire mode, the second camera may receive, by switching between the transmit port and the receive port, data sent by the first sensor. In addition, the second camera no longer receives data or an instruction from the first camera, and therefore does not send data by using the data line, thereby avoiding a data transmission conflict.

In a possible design, the second camera may further configure a data port to a bidirectional data port, and the bidirectional data port supports receiving and sending of data.

With this design, in a three-wire mode, the second camera may set the data port to the bidirectional data port, to receive, through the data port, the data sent by the first sensor. In addition, the second camera may further receive, through the data port, data sent by the first camera, to further improve data transmission efficiency.

In a possible design, when the first chip select signal is in the enable state and the second chip select signal is in the disable state, or when the first chip select signal and the second chip select signal are in the preset state combination, the first camera may send a first indication by using the data line, the first indication is used to control sending of data, and the second camera does not send data in response to the first indication.

With this design, the second camera may not respond to the received first indication, and therefore does not send data by using the data line, thereby avoiding a data transmission conflict.

In a possible design, when the first chip select signal is in the disable state and the second chip select signal is in the enable state, or when the first chip select signal and the second chip select signal are in a preset state combination, the first camera may send a second indication and data by using the data line, the second indication may be used to control receiving of the data, and the second camera may receive the second indication by using the data line and receive the data by using the data line in response to the second indication.

With this design, the first camera may flexibly control a work state of the second camera, so that the second camera receives, based on the second indication from the first camera, the data transmitted on the data line, to improve transmission efficiency.

In a possible design, when the first chip select signal is in the disable state and the second chip select signal is in the enable state, or when the first chip select signal and the second chip select signal are in a preset state combination, the first camera may send a first indication by using the data line, the first indication is used to control sending of data, the second camera may receive the first indication, and send data by using the data line based on the first indication, and the first camera may further receive, by using the data line, the data from the second camera.

With this design, the second camera may send the data to the first camera based on the first indication, to improve transmission efficiency.

In a possible design, when the first chip select signal is in the disable state and the second chip select signal is in the disable state, or when the first chip select signal and the second chip select signal are in a preset state combination (for example, the first chip select signal is in the disable state and the second chip select signal is in the disable state, or in another state combination), the second camera does not send data by using the data line, and does not receive data by using the data line, to implement flexible switching between work modes of the second camera.

In a possible design, the first sensor is a gyroscope sensor. The first sensor data comes from the first sensor, and the first sensor information is gyroscope information.

According to a sixth aspect, this application provides a circuit. The circuit may be connected to the second camera according to the fifth aspect.

For example, the circuit may include some or all components of an SPI controller, an SPI control logic unit (or referred to as an SPI control logic circuit), an SPI data receiving/sending switching unit (or referred to as an SPI data receiving/sending switching circuit), or an SPI data port (or referred to as a data port).

The SPI controller may be configured to: when a first camera obtains first sensor data by using an SPI protocol, control the SPI data port to obtain the first sensor data. The SPI data port is configured for the second camera to perform SPI protocol communication with the first camera and/or a first sensor. The first camera is a master SPI device, and the second camera and the first sensor are slave SPI devices.

In a possible design, the SPI data port may send the obtained first sensor data to the second camera.

In a possible design, the SPI data port is connected to the first camera and the first sensor by using a data line.

In a possible design, the circuit further includes the SPI control logic unit, configured to receive a first chip select signal and a second chip select signal from the first camera. A combination of the first chip select signal and the second chip select signal is used to control whether to enable the second camera. When the first chip select signal is in an enable state and the second chip select signal is in a disable state, the SPI control logic circuit may control the SPI controller to control the SPI data port to receive data sent by the first sensor to the first camera on the data line.

In a possible design, the circuit further includes the SPI control logic unit, configured to receive a first chip select signal and a second chip select signal from the first camera. A combination of the first chip select signal and the second chip select signal is used to control whether to enable the second camera. When the first chip select signal and the second chip select signal are in a preset state combination, the SPI control logic circuit may control the SPI controller to control the SPI data port to receive data sent by the first sensor to the first camera on the data line.

In a possible design, the SPI control logic unit may further control the SPI controller to control the SPI data port to receive data sent by the first camera to the first sensor on the data line.

In a possible design, if a transmit port of the second camera is connected to a receive port of the first camera by using a first data line, a receive port of the second camera is connected to a transmit port of the first camera by using a second data line, the data line includes the first data line and the second data line, the transmit port of the second camera and the transmit port of the first camera are configured to send data, and the receive port of the second camera and the receive port of the first camera are configured to receive data, when the first chip select signal is in the enable state and the second chip select signal is in the disable state, or when the first chip select signal and the second chip select signal are in the preset state combination, the SPI control logic unit may further configure the transmit port to receive data transmitted on the data line.

In a possible design, the circuit further includes the SPI data receiving/sending switching circuit. The SPI controller may include a sending module and a receiving module. The sending module is configured to send data, and the receiving module is configured to receive data. When the first chip select signal is in the enable state and the second chip select signal is in the disable state, or when the first chip select signal and the second chip select signal are in the preset state combination, the SPI control logic unit may further control the SPI data receiving/sending switching circuit to connect the transmit port to the receiving module.

In a possible design, the SPI control logic unit may further configure the SPI data port to a bidirectional data port, and the bidirectional data port supports receiving and sending of data.

In a possible design, when the first chip select signal is in the enable state and the second chip select signal is in the disable state, or when the first chip select signal and the second chip select signal are in the preset state combination, the SPI control logic unit may further control the SPI controller not to send data in response to a first indication transmitted by the data line. The first indication is used to control sending of data.

In a possible design, when the first chip select signal is in the disable state and the second chip select signal is in the enable state, or when the first chip select signal and the second chip select signal are in a preset state combination, the SPI control logic unit may control the SPI controller to receive, through the SPI data port, a second indication transmitted on the data line. The SPI controller may control, in response to the second indication, the SPI data port to receive data transmitted on the data line. The second indication is used to control receiving of data.

In a possible design, when the first chip select signal is in the disable state and the second chip select signal is in the enable state, or when the first chip select signal and the second chip select signal are in a preset state combination, the SPI control logic unit may control the SPI controller to receive, through the SPI data port, a first indication transmitted on the data line. The SPI controller may control, in response to the first indication, the SPI data port to send data to the data line. The first indication is used to control sending of the data.

In a possible design, when the first chip select signal is in the disable state and the second chip select signal is in the disable state, or when the first chip select signal and the second chip select signal are in a preset state combination, the SPI control logic unit may control the SPI controller not to send data by using the data line and control the SPI controller not to receive data by using the data line.

According to a seventh aspect, this application provides a circuit. The circuit may be connected to the first camera according to the fifth aspect.

For example, the circuit may include a control unit (or referred to as a control circuit) and an SPI data port.

The SPI data port may be configured for the first camera to obtain first sensor data by using an SPI protocol. The control circuit may be configured to control a second camera to obtain the first sensor data by using the SPI protocol at the same time. The first camera is a master SPI device, and the second camera and a first sensor are slave SPI devices. The first sensor data comes from the first sensor.

In a possible design, the SPI data port is connected to the second camera and the first sensor by using a data line.

In a possible design, the control circuit may output a first chip select signal to the second camera and the first sensor, and output a second chip select signal to the second camera and the first sensor. A state combination of the first chip select signal and the second chip select signal is used to control whether to enable the second camera and is used to control whether to enable the first sensor.

In a possible design, when the first chip select signal is in an enable state and the second chip select signal is in a disable state, the control circuit may control the first sensor to send data by using the data line, and control the SPI data port to receive, by using the data line, the data sent by the first sensor; and control the second camera to receive, by using the data line, the data sent by the first sensor to the first camera.

In a possible design, when the first chip select signal and the second chip select signal are in a preset state combination, the control circuit may control the first sensor to send data by using the data line, and control the SPI data port to receive, by using the data line, the data sent by the first sensor; and control the second camera to receive, by using the data line, the data sent by the first sensor to the first camera.

In a possible design, the control circuit may further control the SPI data port to send data to the first sensor by using the data line, and control the second camera to receive, by using the data line, the data sent by the first camera to the first sensor.

In a possible design, when the first chip select signal is in the enable state and the second chip select signal is in the disable state, or when the first chip select signal and the second chip select signal are in the preset state combination, the control circuit may control the SPI data port to send a first indication by using the data line. The first indication is used to control sending of data.

In a possible design, when the first chip select signal is in the enable state and the second chip select signal is in the disable state, or when the first chip select signal and the second chip select signal are in the preset state combination, the control circuit may control the SPI data port to send a first indication by using the data line. The first indication is used to control sending of data.

According to an eighth aspect, this application provides a camera module. The camera module may include the circuit according to any one of the sixth aspect or the designs of the sixth aspect, to implement functions of the circuit according to any one of the sixth aspect or the designs of the sixth aspect. The camera module may further include a motor and a second camera. When a first sensor is a gyroscope sensor, the motor may be configured to obtain first sensor data (that is, gyroscope data) by using the circuit, to perform shake control and/or auto focus (AF) of the camera based on the first sensor data.

According to a ninth aspect, this application provides a camera module. The camera module may include the circuit according to any one of the seventh aspect or the designs of the seventh aspect, to implement functions of the circuit according to any one of the seventh aspect or the designs of the seventh aspect. The camera module may further include a motor and a first camera. When a first sensor is a gyroscope sensor, the motor may be configured to obtain first sensor data (that is, gyroscope data) by using the circuit, to perform shake control and/or auto focus of the camera based on the first sensor data.

According to a tenth aspect, this application provides a terminal device. The terminal device may include the data transmission system according to any one of the fifth aspect or the designs of the fifth aspect, and therefore, the terminal device may have the functions according to any one of the fifth aspect or the designs of the fifth aspect; and/or the terminal device may include the circuit according to any one of the sixth aspect or the designs of the sixth aspect, and therefore, the terminal device may have functions of the circuit according to any one of the sixth aspect or the designs of the sixth aspect; and/or the terminal device may include the circuit according to any one of the seventh aspect or the designs of the seventh aspect, and therefore, the terminal device may have functions of the circuit according to any one of the seventh aspect or the designs of the seventh aspect; and/or the terminal device may include the camera module according to any one of the eighth aspect or the designs of the eighth aspect, and therefore, the terminal device may have functions of the camera module according to any one of the eighth aspect or the designs of the eighth aspect; and/or the terminal device may include the camera module according to any one of the ninth aspect or the designs of the ninth aspect, and therefore, the terminal device may have functions of the camera module according to any one of the ninth aspect or the designs of the ninth aspect; and/or the terminal device may be a photographing device. The terminal device may further include an image processing chip that may perform image signal processing (ISP), configured to obtain an image signal from the camera module, and process the image signal, for example, perform high definition processing on the image signal output by the camera module.

According to an eleventh aspect, this application provides a terminal device, including a first camera module, a second camera module, and a gyroscope sensor configured to output gyroscope information. The first camera module, the second camera module, and the gyroscope sensor are connected by using a serial peripheral interface SPI. The first camera module serves as a master SPI apparatus, the gyroscope sensor and the second camera module serve as slave SPI apparatuses, and the first camera module and the second camera module simultaneously obtain the gyroscope information from the gyroscope sensor under control of SPI chip select signals sent by the first camera module. The image processing unit is configured to obtain an image signal from the first camera module and the second camera module.

In a possible design, both the first camera module and the second camera module are connected to the gyroscope sensor by using a data line. When the SPI chip select signals sent by the first camera module are in a preset state combination, the first camera module and the second camera module simultaneously obtain the gyroscope information from the gyroscope sensor.

In a possible design, both the first camera module and the second camera module are connected to the gyroscope sensor by using a data line. When the SPI chip select signals sent by the first camera module enable the second camera module and the gyroscope sensor, the first camera module and the second camera module simultaneously obtain the gyroscope information from the gyroscope sensor.

In a possible design, the second camera module and the gyroscope sensor simultaneously receive data from the first camera module.

It should be understood that for beneficial effects of the second aspect and the possible designs of the second aspect to the eleventh aspect and the possible designs of the eleventh aspect, refer to descriptions of beneficial effects in the first aspect and the possible designs of the first aspect.

DESCRIPTION OF EMBODIMENTS

Figure 1:
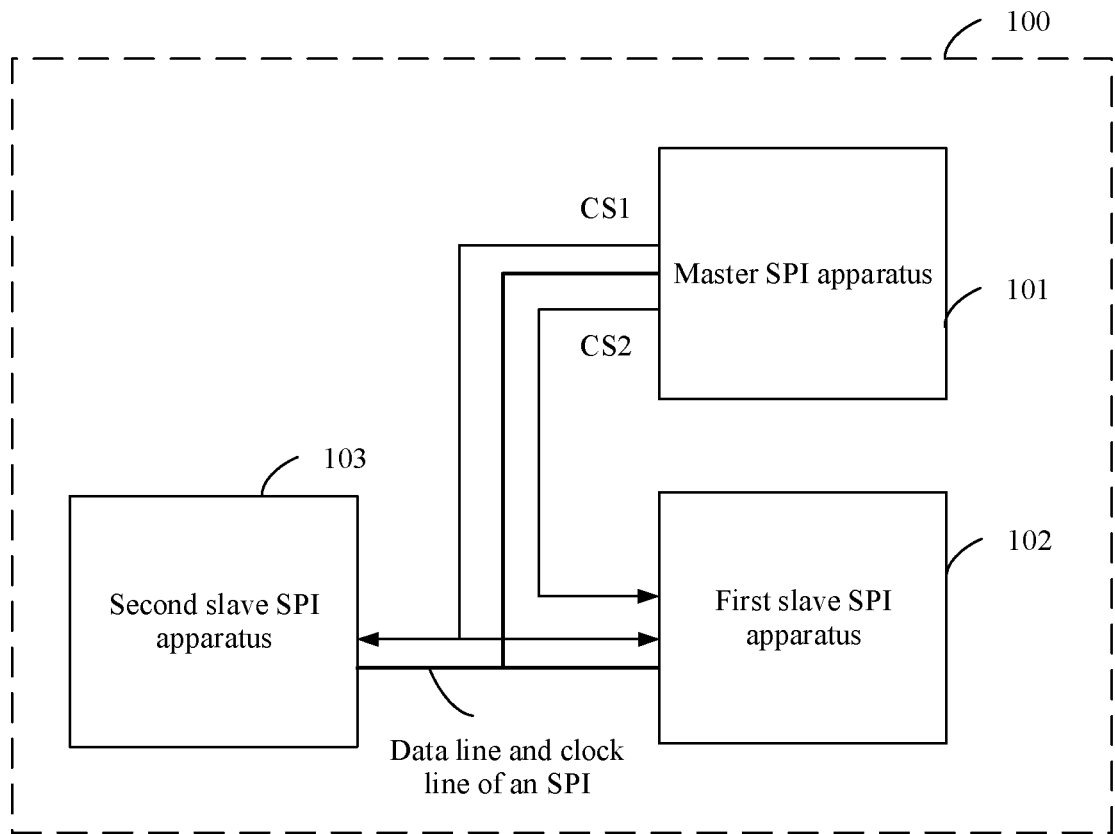
FIG. 1 is a schematic diagram of a structure of a data transmission system according to an embodiment of this application.

To make objectives, technical solutions, and advantages of this application clearer, the following further describes this application in detail with reference to accompanying drawings. An example operation method in a method embodiment may also be applied to an apparatus embodiment or a system embodiment.

The following explains terms in this application:

At least one means one or more, that is, including one, two, three, or more.

A plurality of means two or more, that is, including two, three, or more.

Carry may mean that a message is used to carry information or data, or may mean that a message includes information.

The coupling is indirect coupling or a communication connection between apparatuses, units, or modules for information exchange between the apparatuses, the units, or the modules, and may be in electrical, mechanical, or other forms.

An SPI structure may include a master SPI apparatus (or referred to as a master device or a master apparatus) and a slave SPI apparatus (or referred to as a slave device or a slave apparatus), and an SPI connection line between the master SPI apparatus and the slave SPI apparatus. The SPI connection line between the master SPI apparatus and the slave SPI apparatus may include a chip select signal line, a serial synchronization clock signal line (SCK) (which may be referred to as a clock line below), a data line, and the like. When the master SPI apparatus is connected to a plurality of slave SPI apparatuses by using a clock line and a data line, the master SPI apparatus may enable (or select) a slave SPI apparatus by using a chip select signal, and indicate, by using an indication bit (referred to as a write indication bit below) of the data line and the clock line, the enabled slave SPI apparatus to send data by using the data line, and the master SPI apparatus may read, by using the data line, the data sent by the slave SPI apparatus. Alternatively, the master SPI apparatus may indicate, by using an indication bit (referred to as a read indication bit below) of the data line and the clock line, the enabled slave SPI apparatus to read data by using the data line, and the master SPI apparatus may further send the data by using the data line, so that the slave SPI apparatus receives the data by using the data line.

In this application, the chip select signal line refers to a signal line for transmitting a chip select signal (CS). The chip select signal may include an enable state and a disable state. When the master SPI apparatus drives the chip select signal to the enable state, the chip select signal may be used to enable a slave SPI apparatus. Alternatively, the master SPI apparatus 101 may drive the chip select signal to the disable state, to cause the slave SPI apparatus to be in a non-selected state. For example, when the chip select signal is at a low level (for example, a potential of 0), the chip select signal is in the enable state, and when the chip select signal is at a high level (for example, a potential of 1), the chip select signal is in the disable state.

The clock line may be generated by the master SPI apparatus. The clock line may be used to perform clock synchronization to the master SPI apparatus and the slave SPI apparatus.

The data line may include a serial data line (SDA) in a three-wire mode. The SDA is a bidirectional data line. The data line may alternatively include a serial data output (SDO) and a serial data input (SDI) in a four-wire mode. Both the SDO and the SDI are unidirectional data lines. The SDO may be configured for the SPI apparatus to send data, and the SDI may be configured for the SPI apparatus to receive data. In the four-wire mode, a data line that transmits data from the master SPI apparatus to the slave SPI apparatus may also be referred to as a master output/slave input (MOSI) data line, that is, the MOSI may be configured to transmit data sent by the master SPI apparatus by using the SDO, and the slave SPI apparatus may receive the data from the MOSI by using the SDI. A data line that transmits data from the slave SPI apparatus to the master SPI apparatus may also be referred to as a master input/slave output (MISO) data line, that is, the MISO may be configured to transmit data sent by the slave SPI apparatus by using the SDO, and the master SPI apparatus may receive data from the MISO by using the SDI.

For a data port, the SPI apparatus may send data to or receive data from the data line through the data port. For the three-wire mode, the SPI apparatus may have at least one data port, and the data port is a bidirectional data port and can support receiving and sending of data. In three-wire mode, the data port may be connected to the SDA. For the four-wire mode, the SPI apparatus may include at least two data ports. One data port may serve as a transmit port, configured to support sending of data, and the transmit port is connected to the SDO. One data port may serve as a receive port, configured to support receiving of data, and the receive port is connected to the SDI.

A read/write indication bit may include a read indication bit and a write indication bit. The read indication bit may be used to control a slave SPI apparatus that receives a read indication to receive data by using a data line. For example, the read/write indication bit may be the first data bit output by the master SPI apparatus after the clock line starts. For example, in the three-wire mode, the read/write indication bit may be the first data bit output by the master SPI apparatus by using the SDA after the clock line starts. In four-wire mode, the read/write indication bit may be the first data bit output by the master SPI apparatus by using the SDO after the clock line starts. If the first data bit after the clock line starts is set to 1, the data bit may be referred to as the read indication bit. The write indication bit may be used to control a slave SPI apparatus that receives a write indication to send data by using a data line. For example, if the first data bit after the clock line starts is set to 0, the data bit may be referred to as the write indication bit. It should be understood that, in this application, the write indication bit may also be referred to as a first indication. The read indication bit may also be referred to as a second indication.

In addition, it should be understood that, in embodiments of this application, "and/or" describes an association relationship between associated objects, and indicates that three relationships may exist. For example, A and/or B may indicate the following cases: only A exists, both A and B exist, and only B exists, where A and B may be singular or plural. The character "/" usually indicates an "or" relationship between associated objects. At least one of the following items (pieces) or a similar expression thereof indicates any combination of these items, including a single item (piece) or any combination of a plurality of items (pieces). For example, at least one (item) of a, b, or c may represent a, b, c, a and b, a and c, b and c, or a, b and c, where a, b, and c may be singular or plural.

The following describes embodiments of this application in detail with reference to accompanying drawings.

A data transmission method provided in embodiments of this application may be applied to an SPI bus system (or referred to as an SPI structure). The system may include one master SPI apparatus and at least two slave SPI apparatuses, and the master SPI apparatus is connected to the at least two slave SPI apparatuses by using a data line.

As shown in FIG. 1, a data transmission system 100 provided in an embodiment of this application may include a master SPI apparatus 101, a first slave SPI apparatus 102, and a second slave SPI apparatus 103.

It should be understood that the data transmission system 100 provided in this embodiment of this application may be applied to a terminal device or another electronic device having a SPI structure, for example, may be applied to a device such as a mobile terminal or a computer. For example, a possible application scenario of the data transmission system 100 provided in this embodiment of this application is a photographing device that includes a plurality of camera modules. The photographing device may be a smartphone, a mobile smart device, a smart home device, a tablet computer, or the like with a photographing function, or may be a portable, pocket-sized, hand-held, computer built-in, or in-vehicle mobile apparatus.

In this scenario, the master SPI apparatus 101 may include one of the plurality of camera modules of the photographing device (in this application, the camera module serving as a master SPI apparatus may be referred to as a camera module A), the first slave SPI apparatus 102 may include another camera module of the photographing device (in this application, the camera module serving as a slave SPI apparatus may be referred to as a camera module B), and the second slave SPI apparatus 103 may include a gyroscope sensor of the photographing device. The gyroscope sensor may be deployed on a main board of the photographing device. For example, each camera module may include a motor drive chip, or referred to as a motor drive integrated circuit (IC). The motor drive IC may be configured to output a current or a pulse width modulation (PWM) signal to control a motor of the camera module to perform a moving operation as required, to implement shake compensation.

In the data transmission system 100, the master SPI apparatus 101, the first slave SPI apparatus 102, and the second slave SPI apparatus 103 are connected by using a data line. For example, if the master SPI apparatus 101, the first slave SPI apparatus 102, and the second slave SPI apparatus 103 are connected in a three-wire mode, the data line may include an SDA. Alternatively, if the master SPI apparatus 101, the first slave SPI apparatus 102, and the second slave SPI apparatus 103 are connected in a four-wire mode, the data line may include an SDO and an SDI.

In addition, the master SPI apparatus 101, the first slave SPI apparatus 102, and the second slave SPI apparatus 103 are further connected by using a clock line.

As shown in FIG. 1, the master SPI apparatus 101 outputs a first chip select signal (CS1) to the first slave SPI apparatus 102 and outputs a second chip select signal (CS2) to the first slave SPI apparatus 102. Therefore, the master SPI apparatus 101 may enable, by using a combination of an enable state or a disable state of the first chip select signal and an enable state or a disable state of the second chip select signal, the first slave SPI apparatus 102 to be in a plurality of work modes.

The master SPI apparatus 101 may further output the first chip select signal to the second slave SPI apparatus 103, to enable the second slave SPI apparatus 103 by using the first chip select signal. Specifically, when the first chip select signal is in the enable state, the first chip select signal enables the second slave SPI apparatus 103, and the second slave SPI apparatus 103 may send data by using the data line based on a write indication bit output by the master SPI apparatus 101. Alternatively, the second slave SPI apparatus 103 may read data by using the data line based on a read indication bit output by the master SPI apparatus 101.

Figure 2:
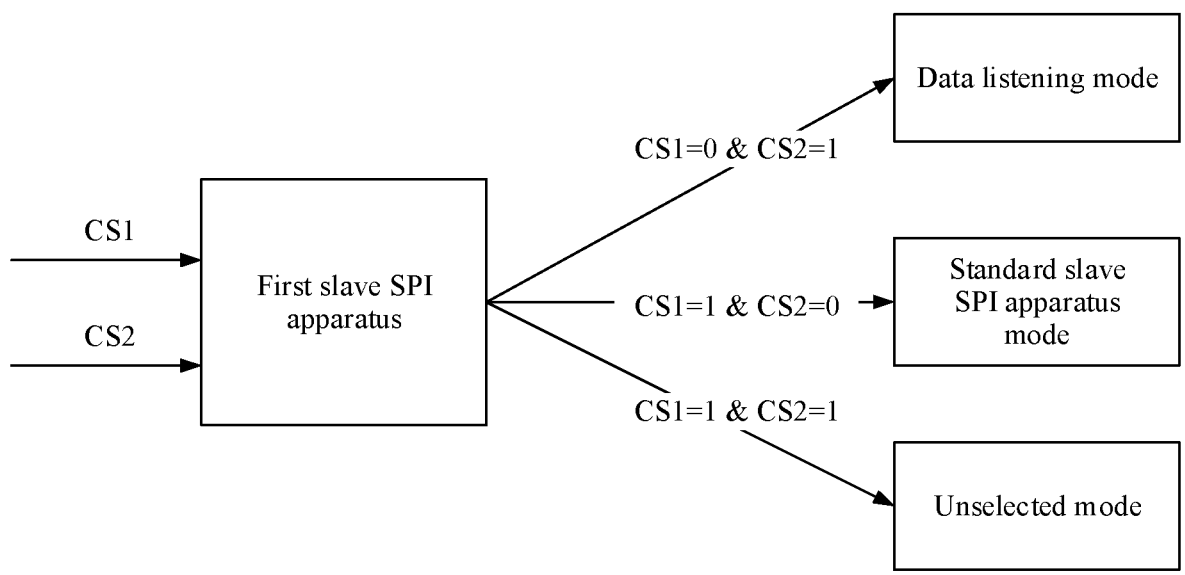
FIG. 2 is a schematic diagram of a dual-chip select logic determining result according to an embodiment of this application.

For example, a dual-chip select logic determining result of the first slave SPI apparatus 102 may be represented by FIG. 2. The dual-chip select logic determining result is a work mode of the first slave SPI apparatus 102. In FIG. 2, CS1=0 indicates that the first chip select signal is in the enable state, CS2=0 indicates that the second chip select signal is in the enable state, CS1=1 indicates that the first chip select signal is in the disable state, and CS2=1 indicates that the second chip select signal is in the disable state. "a & b" means a and b.

According to FIG. 2, when CS1=0 & CS2=1, the dual-chip select logic determining result is a data listening mode, and the first slave SPI apparatus 102 may enter the data listening mode based on the determining result (or in other words, the first slave SPI apparatus 102 is in the data listening mode). In the data listening mode, the first slave SPI apparatus 102 may receive data by using the data line, but not send data by using the data line. In other words, in the data listening mode, regardless of whether the master SPI apparatus 101 outputs a write indication bit or a read indication bit, the first slave SPI apparatus 102 only listens on the data line and receives data transmitted on the data line.

When CS1=1 & CS2=0, the dual-chip select logic determining result is a standard slave SPI apparatus mode (or referred to as a standard slave mode), and the first slave SPI apparatus 102 may enter the standard slave SPI apparatus mode based on the determining result (or in other words, the first slave SPI apparatus 102 is in the standard slave SPI apparatus mode). In the standard slave mode, the first slave SPI apparatus 102 may receive data by using the data line based on a read indication bit output by the master SPI apparatus 101, and may also send data by using the data line based on a write indication bit output by the master SPI apparatus 101.

In addition, when CS1=1 & CS2=1, the dual-chip select logic determining result is an unselected mode, and the first slave SPI apparatus 102 may enter the unselected mode based on the determining result (or in other words, the first slave SPI apparatus 102 is in the unselected mode). In the unselected mode, the first slave SPI apparatus 102 does not receive data by using the data line, nor sends data by using the data line. In other words, in the unselected mode, regardless of whether the master SPI apparatus 101 outputs a write indication bit or a read indication bit, the first slave SPI apparatus 102 does not respond to an indication of the master SPI apparatus 101.

Figure 3:
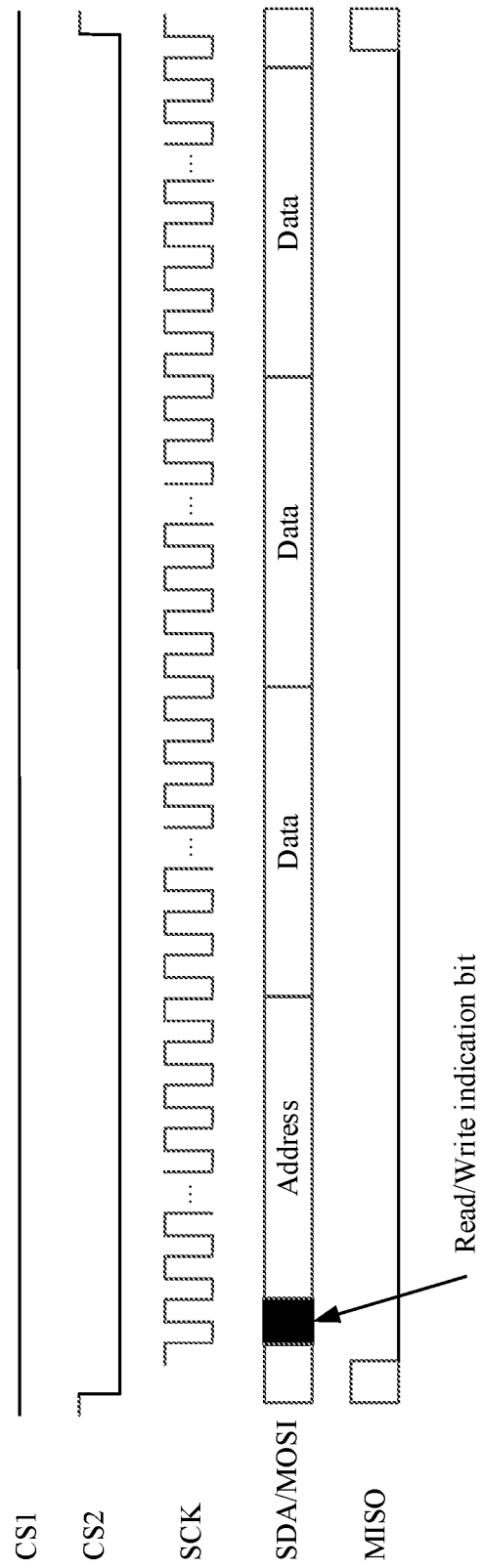
FIG. 3 is a schematic diagram of a time sequence of data transmission according to an embodiment of this application.

A bus access mode of the first slave SPI apparatus 102 in the data listening mode is described by using FIG. 3 as an example. As shown in FIG. 3, when CS1=0 & CS2=1, regardless of whether the master SPI apparatus 101 sets the first data bit (that is, a read/write indication bit) after an SCK starts to 0 (representing write) or 1 (representing read), because the first slave SPI apparatus 102 is in the data listening mode, the first slave SPI apparatus 102 supports only data input and does not output data to the data line (including the SDA in the three-wire mode or the SDO in the four-wire mode).

Figure 4:
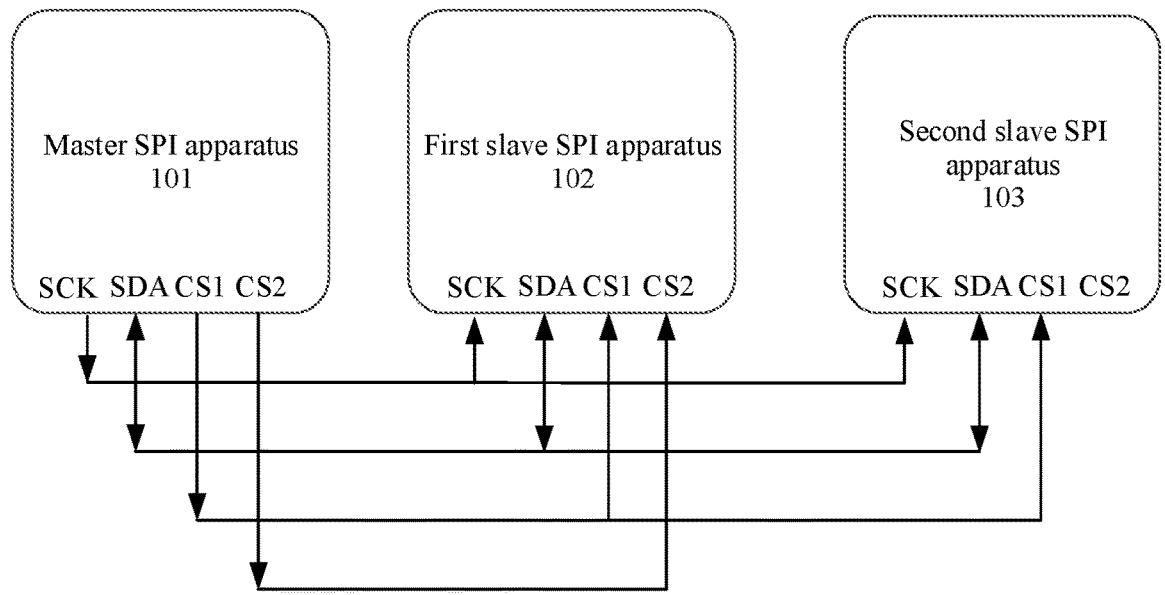
FIG. 4 is a schematic diagram of a connection relationship of a data transmission system according to an embodiment of this application.

Specifically, for the three-wire mode, a connection relationship between the master SPI apparatus 101, the first slave SPI apparatus 102, and the second slave SPI apparatus 103 is shown in FIG. 4. It can be learned that respective data ports (data ports connected to the SDA) of the master SPI apparatus 101, the first slave SPI apparatus 102, and the second slave SPI apparatus 103 all support bidirectional data transmission. For example, when in the three-wire mode, the first slave SPI apparatus 102 may configure its data port to a bidirectional port.

As shown in FIG. 4, in the three-wire mode, when the master SPI apparatus 101 drives the first chip select signal to the enable state and drives the second chip select signal to the disable state, if the master SPI apparatus 101 sends a write indication bit by using the SDA, after receiving the write indication bit by using the SDA, the second slave SPI apparatus 103 may send data by using the SDA in response to the write indication bit, the master SPI apparatus 101 may receive, by using the SDA, the data sent by the second slave SPI apparatus 103, and because the first slave SPI apparatus 102 is in the data listening mode, the first slave SPI apparatus 102 may receive, by using the SDA, the data sent by the second slave SPI apparatus 103. In addition, the first slave SPI apparatus 102 does not send data on the SDA in response to the write indication bit transmitted by the SDA (or in other words, the first slave SPI apparatus 102 skips sending data in response to the write indication bit) to avoid a data conflict on the SDA.

It should be understood that the expression "the SPI apparatus sends data by using the SDA/SDO" in this application means that the SPI apparatus sends data to the SDA/SDO through a transmit port connected to the SDO, and the SDA/SDO sends the data to another SPI apparatus. It should also be understood that the expression "the SPI apparatus receives data by using the SDA/SDI" in this application means that the SPI apparatus receives, from the SDA/SDI through a receive port connected to the SDA/SDI, data sent by another SPI apparatus by using the SDA/SDO of the another SPI apparatus.

In addition, according to FIG. 4, in the three-wire mode, when the master SPI apparatus 101 drives the first chip select signal to the enable state and drives the second chip select signal to the disable state, if the master SPI apparatus 101 sends a read indication bit by using the SDA, the master SPI apparatus 101 may further send data by using the SDA. In this case, the second slave SPI apparatus 103 may receive, in response to the read indication bit by using the SDA, the data sent by the master SPI apparatus 101, and because the first slave SPI apparatus 102 is in the data listening mode, the first slave SPI apparatus 102 may receive, by using the SDA, the data sent by the master SPI apparatus 101. In this way, the plurality of slave SPI apparatuses can simultaneously receive the data sent by the master SPI apparatus, thereby improving efficiency of receiving the data from the master SPI apparatus by the plurality of slave SPI apparatuses.

Figure 5:
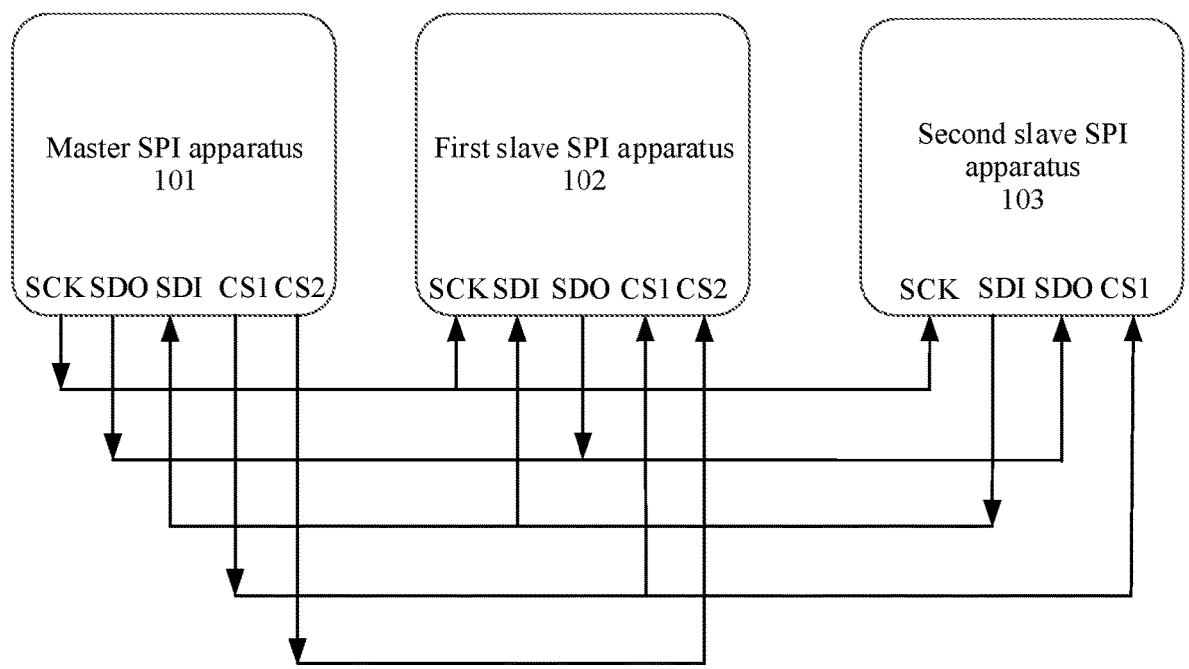
FIG. 5 is a schematic diagram of a connection relationship of another data transmission system according to an embodiment of this application.

For the four-wire mode, when the master SPI apparatus 101 drives the first chip select signal to the enable state and drives the second chip select signal to the disable state, a connection relationship between the master SPI apparatus 101, the first slave SPI apparatus 102, and the second slave SPI apparatus 103 is shown in FIG. 5. It can be learned that the master SPI apparatus 101, the first slave SPI apparatus 102, and the second slave SPI apparatus 103 may send data through respective transmit ports (the transmit ports are connected to the SDO), and may receive data through respective receive ports (the receive ports are connected to the SDI).

As shown in FIG. 5, in the four-wire mode, when the master SPI apparatus 101 sends a write indication bit by using the SDO, the second slave SPI apparatus 103 may send data by using the SDO in response to the write indication bit, the master SPI apparatus 101 may receive, by using the SDI, the data sent by the second slave SPI apparatus 103 by using the SDO, and because the first slave SPI apparatus 102 is in the data listening mode, the first slave SPI apparatus 102 may receive, by using the SDI, the data sent by the second slave SPI apparatus 103 by using the SDO. In addition, the SDO of the first slave SPI apparatus 102 does not receive the write indication bit sent by the master SPI apparatus 101 by using the SDO. Therefore, the first slave SPI apparatus 102 does not send data in response to the write indication bit sent by the master SPI apparatus 101 (or in other words, the first slave SPI apparatus 102 skips sending data in response to the write indication bit) to avoid a data transmission conflict.

In addition, as shown in FIG. 5, for the four-wire mode, when the master SPI apparatus 101 drives the first chip select signal to the enable state and drives the second chip select signal to the disable state, if the master SPI apparatus 101 sends a read indication bit by using the SDO and sends data by using the SDO, the second slave SPI apparatus 103 may receive the data by using the SDI in response to the read indication bit.

Figure 6:
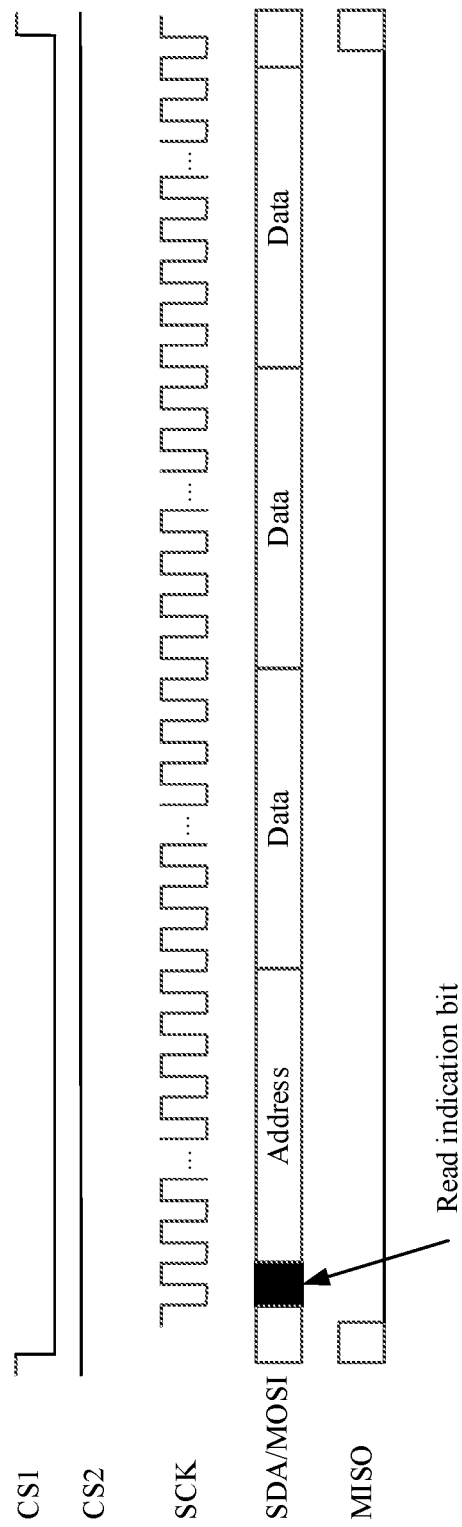
FIG. 6 is a schematic diagram of another time sequence of data transmission according to an embodiment of this application.
Figure 7:
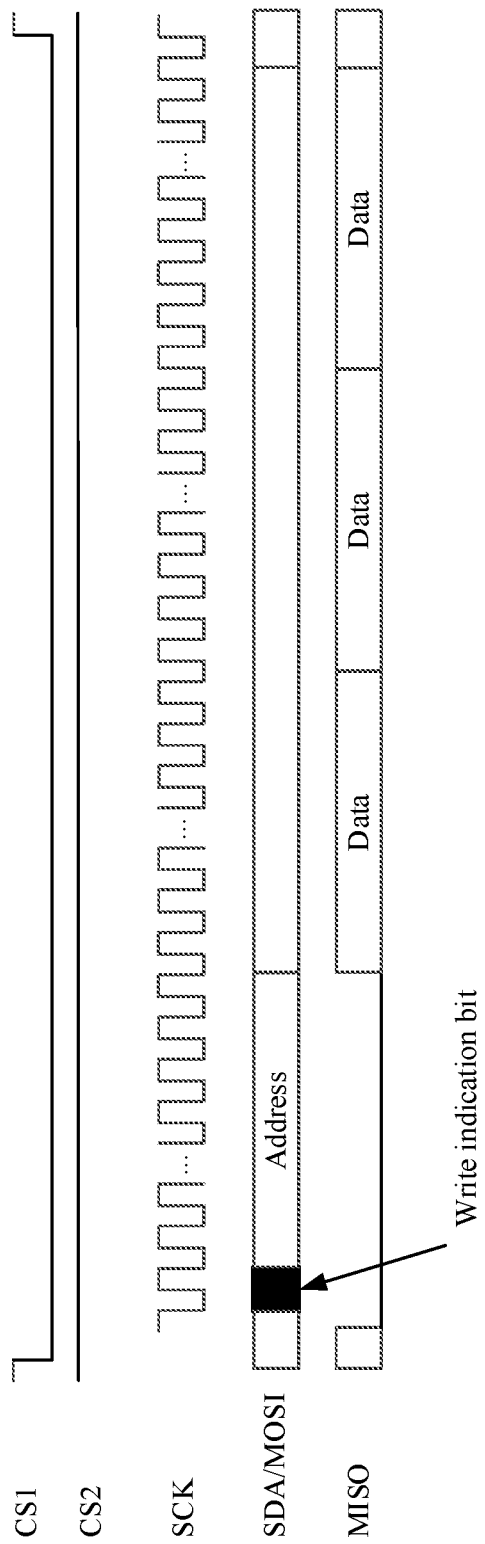
FIG. 7 is a schematic diagram of another time sequence of data transmission according to an embodiment of this application.

A bus access mode of the first slave SPI apparatus 102 in the standard slave SPI apparatus mode is described below by using FIG. 6 and FIG. 7 as an example. As shown in FIG. 6, in the standard slave SPI apparatus mode, the first slave SPI apparatus 102 works in the standard slave SPI apparatus mode, and if the master SPI apparatus 101 sets the first data bit after the SCK starts to 0, the first slave SPI apparatus 102 may read, under control of the master SPI apparatus 101, data transmitted on the data line (SDA or SDI). As shown in FIG. 7, in the standard slave SPI apparatus mode, if the master SPI apparatus 101 sets the first data bit after the SCK starts to 1, the first slave SPI apparatus 102 may send data by using the data line (SDA or SDO) under control of the master SPI apparatus 101. Therefore, when in the standard slave SPI apparatus mode, the first slave SPI apparatus 102 may implement data transmission between the first slave SPI apparatus 102 and the master SPI apparatus 101 under control of the master SPI apparatus 101.

Specifically, for the three-wire mode, a connection relationship between the master SPI apparatus 101, the first slave SPI apparatus 102, and the second slave SPI apparatus 103 is shown in FIG. 4. When the master SPI apparatus 101 drives the first chip select signal to the disable state and drives the second chip select signal to the enable state, if the master SPI apparatus 101 sends a write indication bit by using the SDA, because the first slave SPI apparatus 102 is in the standard slave mode, after receiving the write indication bit by using the SDA, the first slave SPI apparatus 102 may send data by using the SDA in response to the write indication bit, and the master SPI apparatus 101 may receive, by using the SDA, the data sent by the first slave SPI apparatus 102. In this case, the second slave SPI apparatus 103 is in the unselected state, and does not respond to the write indication bit transmitted by the SDA.

In addition, for the three-wire mode, when the master SPI apparatus 101 drives the first chip select signal to the disable state and drives the second chip select signal to the enable state, if the master SPI apparatus 101 sends a read indication bit by using the SDA and transmits data by using the SDA, because the first slave SPI apparatus 102 is in the standard slave mode, the first slave SPI apparatus 102 may receive the data by using the SDA in response to the read indication bit transmitted by the SDA. In addition, in this case, the second slave SPI apparatus 103 is in the unselected state, and does not respond to the read indication bit transmitted by the SDA.

Figure 8:
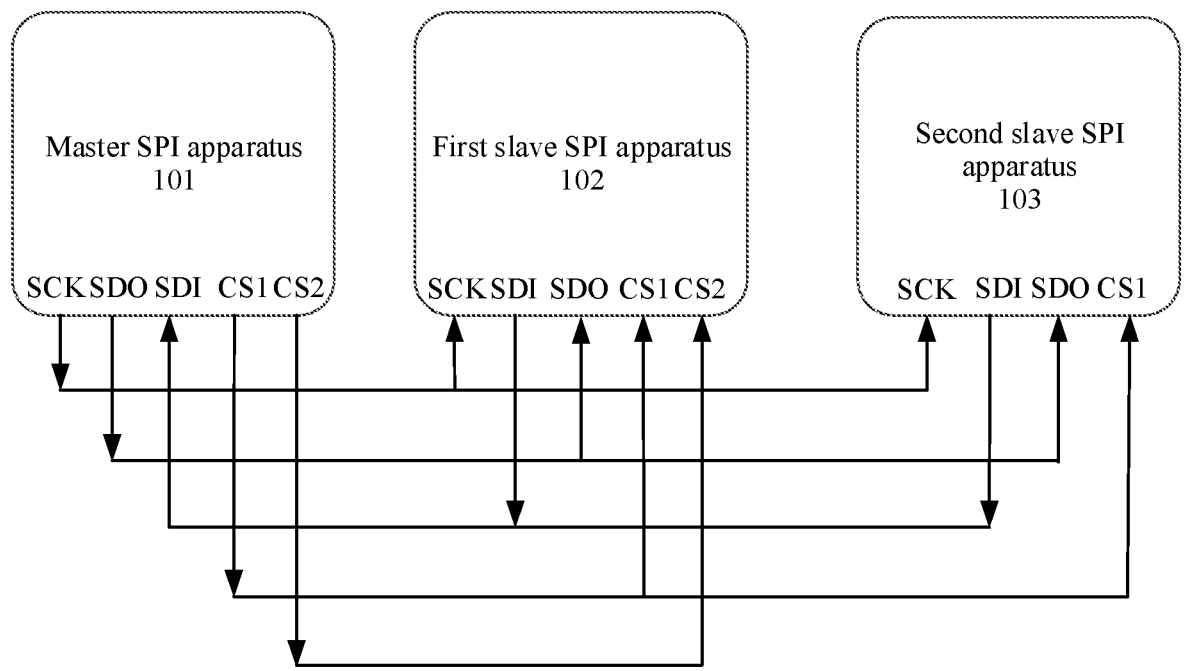
FIG. 8 is a schematic diagram of a connection relationship of another data transmission system according to an embodiment of this application.

For the four-wire mode, a connection relationship between the master SPI apparatus 101, the first slave SPI apparatus 102, and the second slave SPI apparatus 103 is shown in FIG. 8. When the master SPI apparatus 101 drives the first chip select signal to the disable state and drives the second chip select signal to the enable state, if the master SPI apparatus 101 sends a write indication bit by using the SDO, because the first slave SPI apparatus 102 is in the standard slave mode, the first slave SPI apparatus 102 may receive the write indication bit by using the SDI, and send data by using the SDO in response to the write indication bit, and the master SPI apparatus 101 may receive, by using the SDI, the data sent by the first slave SPI apparatus 102 by using the SDO. In addition, in this case, the second slave SPI apparatus 103 is in the unselected state, and does not respond to the write indication bit sent by the master SPI apparatus 101 by using the SDO.

In addition, as shown in FIG. 8, when the master SPI apparatus 101 drives the first chip select signal to the disable state and drives the second chip select signal to the enable state, if the master SPI apparatus 101 sends a read indication bit by using the SDO and sends data by using the SDO, because the first slave SPI apparatus 102 is in the standard slave mode, the first slave SPI apparatus 102 may receive the read indication bit by using the SDI, and read the data by using the SDI in response to the read indication bit. In addition, in this case, the second slave SPI apparatus 103 is in the unselected state, and does not respond to the read indication bit sent by the master SPI apparatus 101 by using the SDO.

It should be understood that, in the unselected mode, for the three-wire mode, a connection relationship between the master SPI apparatus 101, the first slave SPI apparatus 102, and the second slave SPI apparatus 103 is shown in FIG. 4. In addition, in the unselected mode, for the four-wire mode, a connection relationship between the master SPI apparatus 101, the first slave SPI apparatus 102, and the second slave SPI apparatus 103 is shown in FIG. 8.

In some embodiments, the dual-chip select logic determining result may alternatively be represented by Table 1.

TABLE 1

| First chip select signal | Second chip select signal | Work mode of the first slave SPI apparatus |
|---|---|---|
| Enable state | Disable state | Data listening mode |
| Disable state | Enable state | Standard slave SPI apparatus |
| Disable state | Disable state | Unselected mode |

As shown in FIG. 2 or Table 1, when a state of the first chip select signal is the enable state and a state of the second chip select signal is the disable state, the first slave SPI apparatus 102 may be enabled to enter the data listening mode. When the state of the first chip select signal is the disable state and the state of the second chip select signal is the enable state, the first slave SPI apparatus 102 may be enabled to enter the standard slave SPI apparatus mode. When the state of the first chip select signal is the disable state and the state of the second chip select signal is the disable state, the first slave SPI apparatus 102 may be enabled to enter the unselected mode.

With reference to the work modes of the first slave SPI apparatus 102 shown in Table 1 and work modes of the second slave SPI apparatus 103, when the master SPI apparatus 101 drives the first chip select signal to the enable state and drives the second chip select signal to the disable state, the master SPI apparatus 101 may control the second slave SPI apparatus 103 to send data by using the data line, and receive, by using the data line, the data sent by the second slave SPI apparatus 103. In this case, because the first slave SPI apparatus 102 is in the data listening mode, the first slave SPI apparatus 102 may receive the data by using the data line. Therefore, when the master SPI apparatus 101 drives the first chip select signal to the enable state and drives the second chip select signal to the disable state, the master SPI apparatus 101 and the first slave SPI apparatus can simultaneously receive the data sent by the second slave SPI apparatus 103, thereby improving data transmission efficiency between the master SPI apparatus and the plurality of slave SPI apparatuses.

When the master SPI apparatus 101 includes one of the plurality of camera modules of the photographing device, the first slave SPI apparatus 102 includes another camera module of the photographing device, and the second slave SPI apparatus 103 includes a gyroscope sensor of the photographing device, the plurality of camera modules including the master SPI apparatus 101 and the first slave SPI apparatus 102 can simultaneously receive gyroscope information (or referred to as data of the gyroscope sensor) sent by the gyroscope sensor. Herein, the gyroscope information may include data such as X/Y/Z tri-axis angular velocity information of the gyroscope. A camera module supporting optical image stabilization may calculate, based on the X/Y/Z tri-axis angular velocity information of the gyroscope, a shake of a hand during photographing, and control a lens by using a motor (for example, a motor integrated inside the camera module) to implement shake compensation. With the data transmission method, efficiency of receiving the gyroscope information by the plurality of camera modules can be improved, thereby optimizing an optical image stabilization effect.

In addition, the master SPI apparatus 101 should avoid driving the first chip select signal to the enable state and driving the second chip select signal to the enable state at the same time. If the master SPI apparatus 101 incorrectly drives the first chip select signal and the second chip select signal to the enable state at the same time, the first slave SPI apparatus 102 may determine that a drive state is incorrect and does not respond to a bus operation.

In a possible example, the first slave SPI apparatus 102 may switch its data port, to implement switching between the connection relationships shown in FIG. 5 and FIG. 8 without changing a connection line between chips. The switching of the data port includes but is not limited to switching the data port from a unidirectional data port to a bidirectional data port, switching a transmit port to a receive port, or switching a receive port to a transmit port.

When CS1=1 & CS2=0, if a transmit port of the first slave SPI apparatus 102 is connected to a receive port of the master SPI apparatus 101 (or in other words, a transmit port of the first slave SPI apparatus 102 is connected to a receive port of the master SPI apparatus 101 and a transmit port of the second slave SPI apparatus 103), and a receive port of the first slave SPI apparatus 102 is connected to a transmit port of the master SPI apparatus 101 (or in other words, a receive port of the first slave SPI apparatus 102 is connected to a transmit port of the master SPI apparatus 101 and a receive port of the second slave SPI apparatus 103), in response to CS1 and CS2, the first slave SPI apparatus 102 may switch the transmit port of the first slave SPI apparatus 102 to the receive port (or in other words, the first slave SPI apparatus 102 switches the SDO of the first slave SPI apparatus 102 to the SDI), and switch the receive port of the first slave SPI apparatus 102 to the transmit port (or in other words, the first slave SPI apparatus 102 switches the SDI of the first slave SPI apparatus 102 to the SDO), to obtain the connection relationship shown in FIG. 5. In this case, the receive port of the first slave SPI apparatus 102 is connected to the receive port of the master SPI apparatus 101, and the transmit port of the first slave SPI apparatus 102 is connected to the transmit port of the master SPI apparatus 101.

In addition, when CS1≠1 or CS2≠0, if the receive port of the first slave SPI apparatus 102 is connected to the receive port of the master SPI apparatus 101, and the transmit port of the first slave SPI apparatus 102 is connected to the transmit port of the master SPI apparatus 101, in response to CS1 and CS2, the first slave SPI apparatus 102 may switch the receive port of the first slave SPI apparatus 102 to the transmit port (or in other words, the first slave SPI apparatus 102 switches the SDI of the first slave SPI apparatus 102 to the SDO), and switch the transmit port of the first slave SPI apparatus 102 to the receive port (or in other words, the first slave SPI apparatus 102 switches the SDO of the first slave SPI apparatus 102 to the SDI), to obtain the connection relationship shown in FIG. 8.

Figure 9:
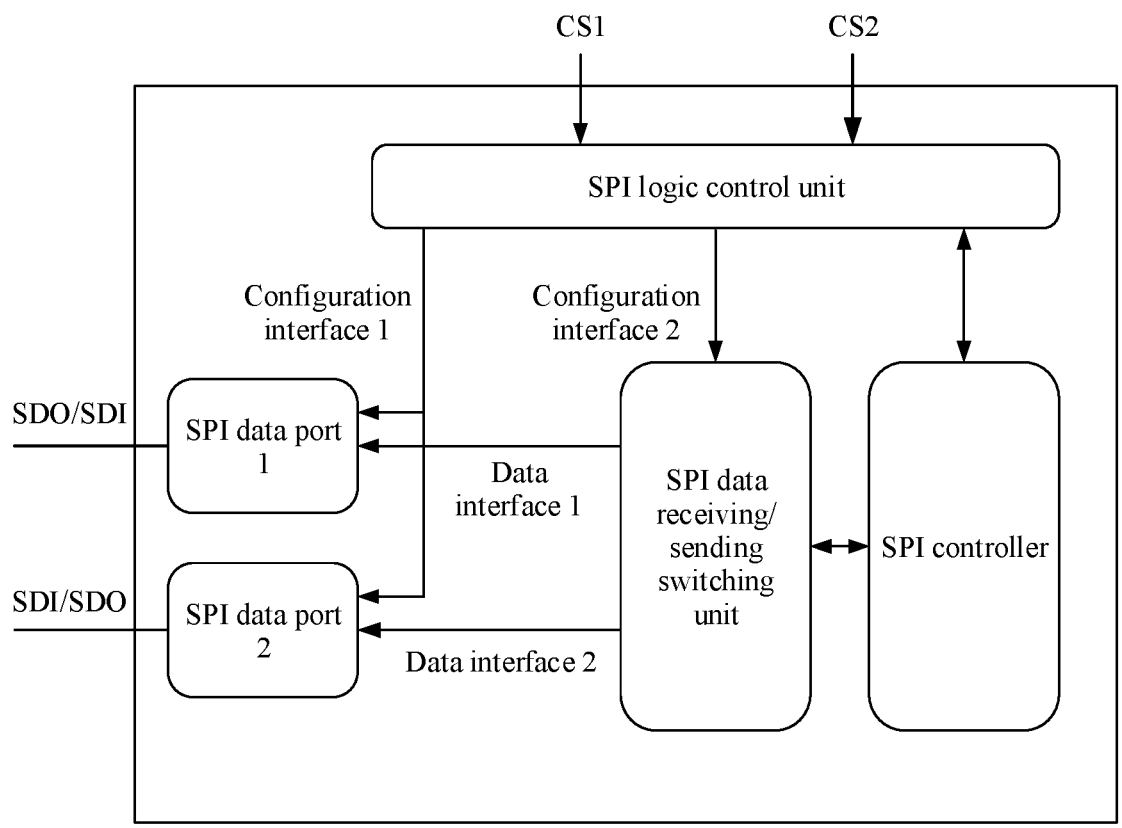
FIG. 9 is a schematic diagram of a structure of a slave SPI apparatus according to an embodiment of this application.

With reference to FIG. 9, the following describes a manner in which the first slave SPI apparatus 102 performs data port switching.

As shown in FIG. 9, the first slave SPI apparatus 102 may include an SPI controller, an SPI control logic unit (or referred to as an SPI control logic circuit), an SPI data receiving/sending switching unit (or referred to as an SPI data receiving/sending switching circuit), an SPI data port (or referred to as a data port), and the like.

For example, the SPI controller may be configured for the first slave SPI apparatus 102 to process data that is to be sent, or configured for the first slave SPI apparatus 102 to process data received by using the data line. For example, the SPI controller may include a sending module and a receiving module. The sending module may be configured to process and send, to the transmit port, data that is to be sent, and the receiving module may be configured to receive and process data from the receive port. The SPI controller may further control receiving and/or sending of data based on a work mode of the first slave SPI apparatus 102. For example, when the first slave SPI apparatus 102 is in the listening mode, the SPI controller may not transmit, to the transmit port, data that is to be sent. For another example, when the first slave SPI apparatus 102 is in the unselected mode, the SPI controller may not transmit, to the transmit port, data that is to be sent, and the SPI controller may not process data from the receive port by using the receiving module.

The SPI control logic unit may receive the first chip select signal and the second chip select signal, and determine a dual-chip select logic determining result based on the first chip select signal and the second chip select signal. The determining result may be shown in FIG. 2 or Table 1. The SPI control logic unit may be further configured to output the logic determining result to the SPI controller, to indicate a work mode of the first slave SPI apparatus 102. The SPI control logic unit may be further configured to configure a transmission direction of the SPI data port based on the logic determining result. The SPI control logic unit may be further configured to control the SPI data receiving/sending switching unit to connect the SPI data port and the sending module and/or the receiving module in the SPI controller.

The SPI data receiving/sending switching unit may be configured to connect the SPI data port and the sending module in the SPI controller under control of the SPI control logic unit, to form a transmit channel. The transmit channel may be configured for the first slave SPI apparatus 102 to send data to the SDO. The SPI data receiving/sending switching unit may be further configured to connect the SPI data port and the receiving module in the SPI controller under control of the SPI control logic unit, to form a receive channel. The receive channel may be configured for the first slave SPI apparatus 102 to receive data from the SDI.

For example, the first slave SPI apparatus 102 may include at least one SPI data port. When a quantity of SPI data ports is one, the first slave SPI apparatus 102 supports only the three-wire mode. When the quantity of SPI data ports is two or more, the first slave SPI apparatus 102 may support the three-wire mode and the four-wire mode.

For example, the SPI data port includes an SPI data port 1 and an SPI data port 2. During port switching, for the three-wire mode, the SPI control logic unit may switch the SPI data port 1 (or the data port 2) to a bidirectional data port. Specifically, the SPI control logic unit may configure, by using a configuration interface 1, a transmission direction of the SPI data port 1 (or the data port 2) to be bidirectional transmission, and control, by using a configuration interface 2, the SPI data port 1 (or the data port 2) to connect to the sending module and the receiving module of the SPI controller.

For example, the SPI data port includes an SPI data port 1 and an SPI data port 2. During port switching, for the four-wire mode, when CS1=0 & CS2=1, the SPI control logic unit may configure transmission directions of the SPI data port 1 and data port 2 by using the configuration interface 1.

For example, in the four-wire mode, when CS1≠0 or CS2≠1, if the transmission direction of the SPI data port 1 is a transmit direction, and the transmission direction of the SPI data port 2 is a receive direction, that is, the SPI data port 1 is a transmit port (in this case, a data line connected to the SPI data port 1 is the SDO), and the SPI data port 2 is a receive port (in this case, a data line connected to the SPI data port 2 is the SDI), when CS1=0 & CS2=1, the SPI control logic unit may configure the transmission direction of the SPI data port 1 to the receive direction by using the configuration interface 1, and configure the transmission direction of the SPI data port 2 to the transmit direction by using the configuration interface 1, that is, the SPI control logic unit configures the SPI data port 1 to the receive port by using the configuration interface 1 (in this case, a data line connected to the SPI data port 1 is the SDI), and configure the SPI data port 2 to the transmit port by using the configuration interface 1 (in this case, a data line connected to the SPI data port 2 is the SDO). In addition, the SPI control logic unit further controls, by using the configuration interface 2, the SPI data receiving/sending switching unit to connect the SPI data interface 1 to the receiving module of the SPI controller, to form a receive channel, and the SPI control logic unit further controls, by using the configuration interface 2, the SPI data receiving/sending switching unit to connect the SPI data interface 2 to the sending module of the SPI controller, to form a transmit channel. So far, the switching between the transmit port and the receive port is completed.

In addition, in the four-wire mode, when the states of CS1 and CS2 change from CS1=0 & CS2=1 to CS1≠0 or CS2≠1 (for example, CS1=1 or CS2=0), if the transmission direction of the SPI data port 1 is a receive direction, and the transmission direction of the SPI data port 2 is a transmit direction, the SPI control logic unit may configure the transmission direction of the SPI data port 1 to be a transmit direction by using the configuration interface 1 (in this case, a data line connected to the SPI data port 1 is the SDO), and configure the transmission direction of the SPI data port 2 to be a receive direction by using the configuration interface 1 (in this case, a data line connected to the SPI data port 2 is the SDI). In addition, the SPI control logic unit further controls, by using the configuration interface 2, the SPI data receiving/sending switching unit to connect the SPI data interface 1 to the sending module of the SPI controller, to form a transmit channel, and the SPI control logic unit further controls, by using the configuration interface 2, the SPI data receiving/sending switching unit to connect the SPI data interface 2 to the receiving module of the SPI controller, to form a receive channel. So far, the switching between the transmit port and the receive port is completed.

For example, functions of some or all components of the SPI control logic unit, the SPI controller, the SPI data receiving/sending switching unit, or the SPI data port shown in FIG. 9 may be implemented by an integrated circuit or a logic circuit.

It should be understood that FIG. 1 merely shows, for example, a data transmission system that includes one master SPI apparatus and two slave SPI apparatuses, and this application is not limited thereto and may be applied to a data transmission system that includes more slave SPI apparatuses. For example, the data transmission system may include at least one master SPI apparatus and two or more slave SPI apparatuses (including a slave SPI apparatus A and a slave SPI apparatus B or including a slave SPI apparatus A, a slave SPI apparatus B, and more SPI apparatuses). The master SPI apparatus outputs at least two SPI chip select signals. A chip select signal CS1 is connected to all the slave SPI apparatuses at the same time, and another chip select signal CS2 is connected to only one slave SPI apparatus B. When CS1=0 & CS2=1, the master SPI apparatus may select one slave SPI apparatus A, and perform a data read/write operation on the slave SPI apparatus A, and the slave SPI apparatus B works in the data listening mode. When CS1=1 & CS=0, the master SPI device may perform a read/write operation on the slave SPI device B.

Based on a same concept, this application further provides a chip. The chip may have functions of the first slave SPI apparatus 102. In other words, the first slave SPI apparatus shown in FIG. 1 may be replaced with the chip.

For example, the chip may have a structure shown in FIG. 9. As shown in FIG. 9, the chip may include components such as an SPI controller, an SPI control logic unit (or referred to as an SPI control logic circuit), an SPI data receiving/sending switching unit (or referred to as an SPI data receiving/sending switching circuit), and an SPI data port (or referred to as a data port).

The SPI control logic unit may be configured to receive a first chip select signal and a second chip select signal from a master SPI apparatus. A combination of the first chip select signal and the second chip select signal is used to enable the chip. The SPI data port may be connected to the master SPI apparatus and a second slave SPI apparatus by using a data line. The SPI control logic unit may be configured to: when the master SPI apparatus drives the first chip select signal to an enable state and drives the second chip select signal to a disable state, control the SPI controller to receive, through the SPI data port, data sent by the second slave SPI apparatus on the data line.

In some embodiments, the SPI data port may include a transmit port and a receive port, the transmit port is connected to a receive port of the master SPI apparatus by using the data line, the receive port is connected to a transmit port of the master SPI apparatus by using the data line, the transmit port is configured for the chip to send data to the data line, and the receive port is configured for the chip to receive data transmitted on the data line. The SPI control logic unit may be further configured to: when the master SPI apparatus drives the first chip select signal to the enable state and drives the second chip select signal to the disable state, configure the transmit port to receive data transmitted on the data line.

The chip may further include the SPI data receiving/sending switching unit. The SPI controller may include a sending module and a receiving module. The sending module is configured to send data, and the receiving module is configured to receive data. The SPI control logic unit may be further configured to: when the master SPI apparatus drives the first chip select signal to the enable state and drives the second chip select signal to the disable state, control the SPI data receiving/sending switching unit to connect the transmit port to the receiving module.

The SPI control logic unit may be further configured to configure the SPI data port to a bidirectional data port, and the bidirectional data port supports receiving and sending of data.

The SPI control logic unit may be further configured to: when the master SPI apparatus drives the first chip select signal to the enable state and drives the second chip select signal to the disable state, control the SPI controller not to send data in response to a first indication transmitted by the data line. The first indication is used to control sending of data.

The SPI control logic unit may be further configured to: when the master SPI apparatus drives the first chip select signal to the disable state and drives the second chip select signal to the enable state, control the SPI controller to receive, through the SPI data port, data transmitted on the data line. The SPI controller may be further configured to: when the master SPI apparatus drives the first chip select signal to the disable state and drives the second chip select signal to the enable state, receive a second indication transmitted on the data line, where the second indication is used to control receiving of data; and receive, in response to the second indication through the SPI data port, data transmitted on the data line.

The SPI control logic unit may be further configured to: when the master SPI apparatus drives the first chip select signal to the disable state and drives the second chip select signal to the enable state, control the SPI controller to receive, through the SPI data port, data transmitted on the data line. The SPI controller may be further configured to: when the master SPI apparatus drives the first chip select signal to the disable state and drives the second chip select signal to the enable state, receive a first indication transmitted on the data line, where the first indication is used to control sending of data; and send data to the data line through the SPI data port in response to the first indication.

The SPI control logic unit may be further configured to: when the master SPI apparatus drives the first chip select signal to the disable state and drives the second chip select signal to the disable state, control the SPI controller not to send data by using the data line, and control the SPI controller not to receive data by using the data line.

Based on a same concept, this application further provides a camera module. The camera module may include the chip, or include the first slave SPI apparatus 102. For example, the first slave SPI apparatus 102 is a motor drive IC in the camera module, or serves a component of the motor drive IC in the camera module. For example, the camera module may support shake compensation.

The camera module may further include a motor and a camera. When a second slave SPI apparatus includes a gyroscope sensor, the motor may be configured to obtain data of the gyroscope sensor from the chip, to perform shake control and/or auto focus on the camera based on the data of the gyroscope sensor.

When the camera module (referred to as a camera module 1 below) serves as the first slave SPI apparatus 102, another camera module (referred to as camera module 2 below) serves as the master SPI apparatus 101, and the gyroscope sensor serves as the second slave SPI apparatus 103, the camera module 1 may receive gyroscope information from the gyroscope sensor by using the data line when the master SPI apparatus drives the first chip select signal to the enable state and drives the second chip select signal to the disable state, and at the same time, the camera module 2 may also receive the gyroscope information from the gyroscope sensor by using the data line, which is not like a conventional technology in which the camera module 2 first receives gyroscope data from the gyroscope sensor, and then the camera module 2 sends the gyroscope data to the camera module 1. Therefore, in this embodiment of this application, efficiency of receiving the gyroscope information by the camera module 1 and the camera module 2 can be improved, and a shake compensation effect of the camera module can be improved.

For example, in the foregoing example, the master SPI apparatus 101 may serve as a motor drive IC of the camera module 2, or a component of the motor drive IC of the camera module 2.

Based on a same concept, this application further provides a terminal device. The terminal device may be a smartphone, a mobile smart device, a smart home device, a tablet computer, or the like, or may be a portable, pocket-sized, hand-held, computer built-in, or in-vehicle mobile apparatus.

For example, the terminal device may include the data transmission system. Alternatively, the terminal device may include the chip.

Alternatively, the terminal device may include the camera module. In this case, the terminal device may be a photographing device, and the photographing device may perform photographing by using the camera module, and implement shake compensation and auto focus in a photographing process. The terminal device may further include an image processing chip, configured to obtain an image signal from the camera module, and process the image signal.

Figure 10:
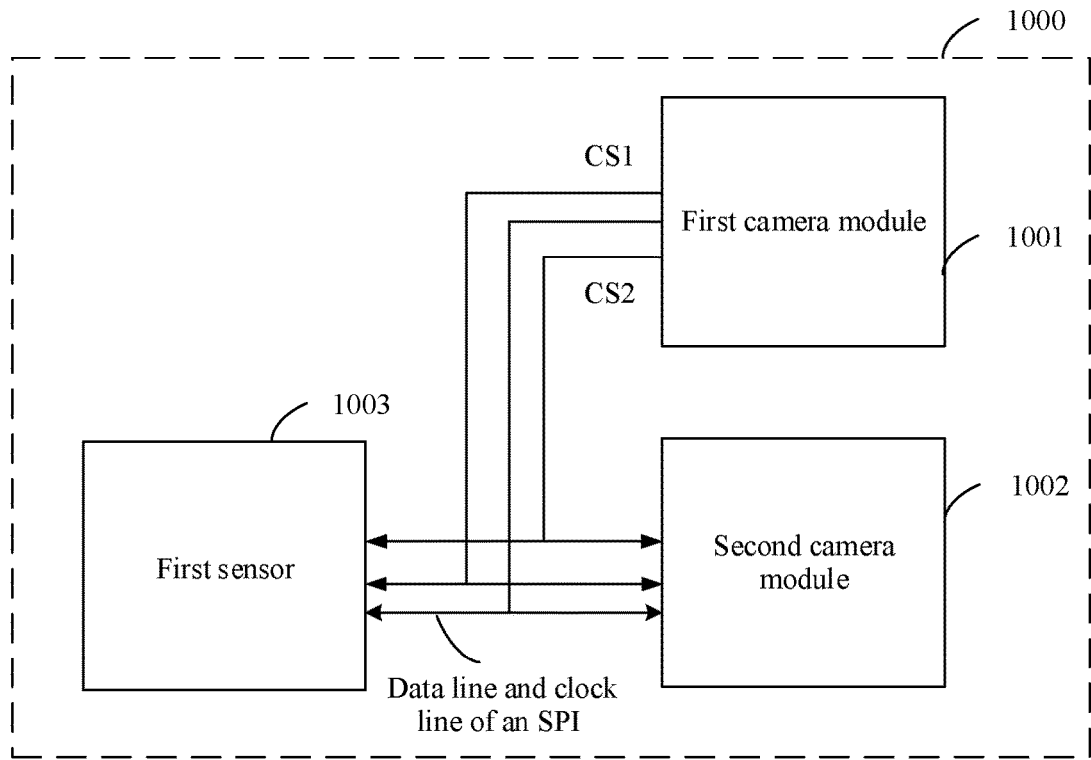
FIG. 10 is a schematic diagram of a structure of a data transmission system according to an embodiment of this application.

Based on a same concept, this application further provides another data transmission system. As shown in FIG. 10, the data transmission system 1000 may include a first camera module 1001, a second camera module 1002, and a first sensor 1003. The first camera module 1001 serves as a master SPI apparatus. The second camera module 1002 and the first sensor 1003 serve as slave SPI apparatuses. The first camera module 1001, the second camera module 1002, and the first sensor 1003 communicate with each other by using an SPI protocol. When the first camera and the second camera run simultaneously, the first camera obtains first sensor data by using the SPI protocol, and the second camera obtains the first sensor data by using the SPI protocol at the same time, to improve efficiency of obtaining the sensor data by the plurality of cameras in the SPI system.

It should be understood that the data transmission system 1000 may be applied to a terminal device or another electronic device having an SPI structure, for example, may be applied to a device such as a mobile terminal or a computer. For example, a possible application scenario of the data transmission system 1000 provided in this embodiment of this application is a photographing device that includes a plurality of camera modules. The photographing device may be a smartphone, a mobile smart device, a smart home device, a tablet computer, or the like with a photographing function, or may be a portable, pocket-sized, hand-held, computer built-in, or in-vehicle mobile apparatus.

In this scenario, the first camera module 1001 may include one camera module or camera of the plurality of camera modules of the photographing device, the second camera module 1002 may include another camera module or camera of the photographing device, and the first sensor 1003 may include a gyroscope sensor of the photographing device. The gyroscope sensor may be deployed on a main board of the photographing device. For example, the first camera module 1001 and the second camera module 1002 may each include at least one motor drive chip, or referred to as a motor drive integrated circuit (IC). The motor drive IC may be configured to output a current or a pulse width modulation (PWM) signal to control a motor of the camera module to perform a moving operation as required, to implement shake compensation.

The following describes a connection manner and a work manner of each component of the data transmission system 1000. It should be understood that, in the following description, the first camera module 1001 may be replaced with a first camera, and the second camera module 1002 may be replaced with a second camera.

In the data transmission system 1000, the first camera module 1001, the second camera module 1002, and the first sensor 1003 are connected by using a data line. For example, any two of the first camera module 1001, the second camera module 1002, and the first sensor 1003 are connected by using a data line, or the first camera module 1001, the second camera module 1002, and the first sensor 1003 are connected by using a same data line. For example, if the first camera module 1001, the second camera module 1002, and the first sensor 1003 are connected in a three-wire mode, the data line may include an SDA. Alternatively, if the first camera module 1001, the second camera module 1002, and the first sensor 1003 are connected in a four-wire mode, the data line may include an SDO and an SDI.

In addition, the first camera module 1001, the second camera module 1002, and the first sensor 1003 are further connected by using a clock line.

As shown in FIG. 10, the first camera module 1001 outputs a first chip select signal (CS1) to the second camera module 1002 and outputs a second chip select signal (CS2) to the second camera module 1002. Therefore, the first camera module 1001 may enable, by using a combination of an enable state or a disable state of the first chip select signal and an enable state or a disable state of the second chip select signal, the second camera module 1002 to be in one of a plurality of work modes.

The plurality of work modes may include a data listening mode, a standard slave SPI apparatus mode, and an unselected mode.

In the data listening mode, the second camera module 1002 may receive, by using the data line, data sent by the first sensor 1003 to the first camera module 1001, and/or receive data sent by the first camera module 1001 to the first sensor 1003. In addition, in the data listening mode, the second camera module 1002 does not send data by using the data line. Therefore, even if a write indication bit from the first camera module 1001 is received, the second camera module 1002 does not send data in response to the write indication bit.

In the standard slave SPI apparatus mode, the second camera module 1002 may send data by using the data line based on a write indication bit from the first camera module 1001, and/or receive data by using the data line based on a read indication bit from the first camera module 1001. Therefore, when receiving a write indication bit from the first camera module 1001, the second camera module 1002 sends data in response to the write indication bit. Alternatively, when receiving a read indication bit from the first camera module 1001, the second camera module 1002 receives data in response to the read indication bit.

For example, the data listening mode may correspond to a preset state combination of the first chip select signal and the second chip select signal. For example, when the first chip select signal is in the enable state and the second chip select signal is in the disable state, the second camera module 1002 is in the data listening mode.

The standard slave SPI apparatus mode may correspond to another preset state combination of the first chip select signal and the second chip select signal. For example, when the first chip select signal is in the disable state and the second chip select signal is the enable state, the second camera module 1002 is in the standard slave SPI apparatus mode.

The unselected mode may correspond to another preset state combination of the first chip select signal and the second chip select signal. For example, when the first chip select signal is in the disable state and the second chip select signal is in the disable state, the second camera module 1002 is in the unselected mode.

It should be understood that the foregoing correspondences between the plurality of work modes and the state combinations of the first chip select signal and the second chip select signal are merely examples for description, and a correspondence between a work mode and a state combination of the chip select signals may be flexibly adjusted based on an application requirement. For example, the following configuration may alternatively be used: When the first chip select signal is in the enable state and the second chip select signal is in the enable state, the second camera module 1002 is in the data listening mode. In addition, correspondences between the plurality of work modes of the second camera module 1002 and state combinations of the first chip select signal and the second chip select signal may alternatively be configured by the master SPI apparatus, that is, the first camera module 1001.

For example, a dual-chip select logic determining result of the second camera module 1002 may be represented by FIG. 2. The dual-chip select logic determining result is a work mode of the second camera module 1002. In FIG. 2, CS1=0 indicates that the first chip select signal is in the enable state, CS2=0 indicates that the second chip select signal is in the enable state, CS1=1 indicates that the first chip select signal is in the disable state, and CS2=1 indicates that the second chip select signal is in the disable state. "a & b" means "a and b".

According to FIG. 2, when CS1=0 & CS2=1, or when CS1 and CS2 are in a preset state combination (for example, a state combination corresponding to the data listening mode of the second camera module 1002), the dual-chip select logic determining result is the data listening mode, and the second camera module 1002 may enter the data listening mode based on the determining result (or in other words, the second camera module 1002 is in the data listening mode). In the data listening mode, the second camera module 1002 may receive data by using the data line, but not send data by using the data line. In other words, in the data listening mode, regardless of whether the first camera module 1001 outputs a write indication bit or a read indication bit, the second camera module 1002 only listens on the data line and receives data transmitted on the data line.

When CS1=1 & CS2=0, or when CS1 and CS2 are in a preset state combination (for example, a state combination corresponding to the standard slave SPI apparatus mode of the second camera module 1002), the dual-chip select logic determining result is the standard slave SPI apparatus mode (or referred to as a standard slave mode), and the second camera module 1002 may enter the standard slave SPI apparatus mode based on the determining result (or in other words, the second camera module 1002 is in the standard slave SPI apparatus mode). In the standard slave mode, the second camera module 1002 may receive data by using the data line based on a read indication bit output by the first camera module 1001, and may also send data by using the data line based on a write indication bit output by the first camera module 1001.

In addition, when CS1=1 & CS2=1, or when CS1 and CS2 are in a preset state combination (for example, a state combination corresponding to the unselected mode of the second camera module 1002), the dual-chip select logic determining result is the unselected mode, and the second camera module 1002 may enter the unselected mode based on the determining result (or in other words, the second camera module 1002 is in the unselected mode). In the unselected mode, the second camera module 1002 does not receive data by using the data line, nor sends data by using the data line. In other words, in the unselected mode, regardless of whether the first camera module 1001 outputs a write indication bit or a read indication bit, the second camera module 1002 does not respond to an indication of the first camera module 1001.

A bus access mode of the second camera module 1002 in the data listening mode is described by using FIG. 3 as an example. As shown in FIG. 3, when CS1=0 & CS2=1, regardless of whether the first camera module 1001 sets the first data bit (that is, a read/write indication bit) after an SCK starts to 0 (representing write) or 1 (representing read), because the second camera module 1002 is in the data listening mode, the second camera module 1002 supports only data input and does not output data to the data line (including the SDA in the three-wire mode or the SDO in the four-wire mode).

Figure 11:
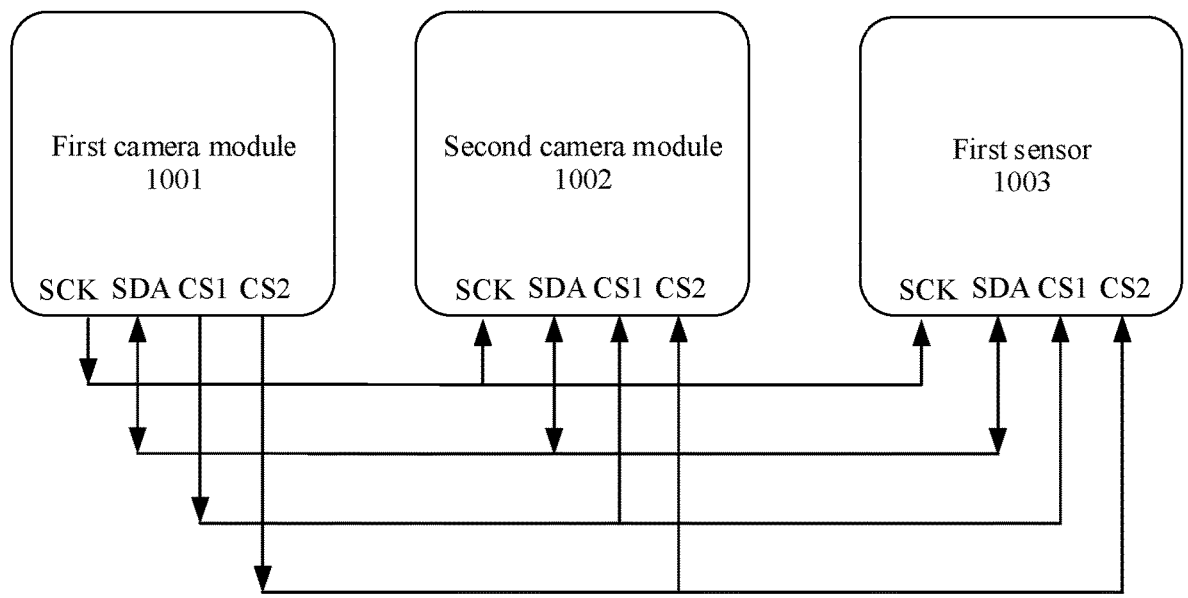
FIG. 11 is a schematic diagram of a connection relationship of another data transmission system according to an embodiment of this application.

Specifically, for the three-wire mode, a connection relationship between the first camera module 1001, the second camera module 1002, and the first sensor 1003 is shown in FIG. 11. It can be learned that respective data ports (data ports connected to the SDA) of the first camera module 1001, the second camera module 1002, and the first sensor 1003 all support bidirectional data transmission. For example, when in the three-wire mode, the second camera module 1002 may configure its data port to a bidirectional port.

As shown in FIG. 11, in the three-wire mode, when the first camera module 1001 drives the first chip select signal to the enable state and drives the second chip select signal to the disable state, if the first camera module 1001 sends a write indication bit by using the SDA, after receiving the write indication bit by using the SDA, the first sensor 1003 may send data by using the SDA in response to the write indication bit, the first camera module 1001 may receive, by using the SDA, the data sent by the first sensor 1003, and because the second camera module 1002 is in the data listening mode, the second camera module 1002 may receive, by using the SDA, the data sent by the first sensor 1003. In addition, the second camera module 1002 does not send data on the SDA in response to the write indication bit transmitted by the SDA (or in other words, the second camera module 1002 skips sending data in response to the write indication bit) to avoid a data conflict on the SDA.

It should be understood that the expression "the SPI apparatus sends data by using the SDA/SDO" in this application means that the SPI apparatus sends data to the SDA/SDO through a transmit port connected to the SDO, and the SDA/SDO sends the data to another SPI apparatus. It should also be understood that the expression "the SPI apparatus receives data by using the SDA/SDI" in this application means that the SPI apparatus receives, from the SDA/SDI through a receive port connected to the SDA/SDI, data sent by another SPI apparatus by using the SDA/SDO of the another SPI apparatus.

In addition, according to FIG. 11, in the three-wire mode, when the first camera module 1001 drives the first chip select signal to the enable state and drives the second chip select signal to the disable state, if the first camera module 1001 sends a read indication bit by using the SDA, the first camera module 1001 may further send data by using the SDA. In this case, the first sensor 1003 may receive, in response to the read indication bit by using the SDA, the data sent by the first camera module 1001, and because the second camera module 1002 is in the data listening mode, the second camera module 1002 may receive, by using the SDA, the data sent by the first camera module 1001. In this way, the plurality of slave SPI apparatuses can simultaneously receive the data sent by the master SPI apparatus, thereby improving efficiency of receiving the data from the master SPI apparatus by the plurality of slave SPI apparatuses.

Figure 12:
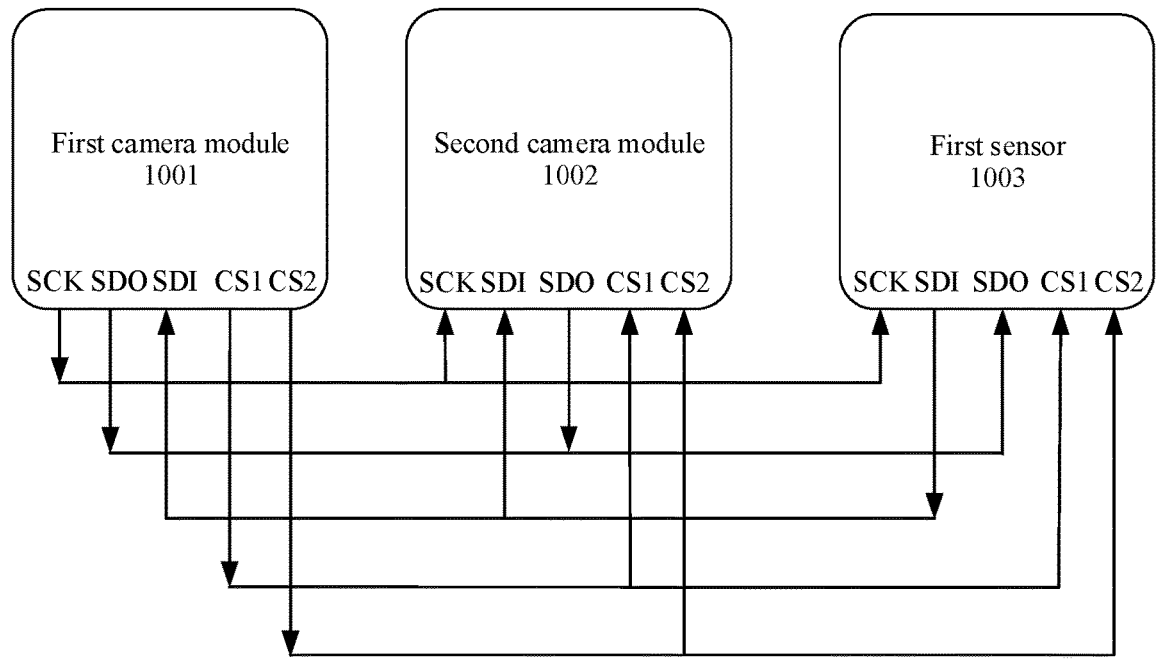
FIG. 12 is a schematic diagram of a connection relationship of another data transmission system according to an embodiment of this application.

For the four-wire mode, when the first camera module 1001 drives the first chip select signal to the enable state and drives the second chip select signal to the disable state, a connection relationship between the first camera module 1001, the second camera module 1002, and the first sensor 1003 is shown in FIG. 12. It can be learned that the first camera module 1001, the second camera module 1002, and the second slave SPI apparatus 10 may send data through respective transmit ports (the transmit ports are connected to the SDO), and may receive data through respective receive ports (the receive ports are connected to the SDI).

As shown in FIG. 12, in the four-wire mode, when the first camera module 1001 sends a write indication bit by using the SDO, the first sensor 1003 may send data by using the SDO in response to the write indication bit, the first camera module 1001 may receive, by using the SDI, the data sent by the first sensor 1003 by using the SDO, and because the second camera module 1002 is in the data listening mode, the second camera module 1002 may receive, by using the SDI, the data sent by the first sensor 1003 by using the SDO. In addition, the SDO of the second camera module 1002 does not receive the write indication bit sent by the first camera module 1001 by using the SDO. Therefore, the second camera module 1002 does not send data in response to the write indication bit sent by the first camera module 1001 (or in other words, the second camera module 1002 skips sending data in response to the write indication bit) to avoid a data transmission conflict.

In addition, as shown in FIG. 12, for the four-wire mode, when the first camera module 1001 drives the first chip select signal to the enable state and drives the second chip select signal to the disable state, if the first camera module 1001 sends a read indication bit by using the SDO and sends data by using the SDO, the first sensor 1003 may receive the data by using the SDI in response to the read indication bit.

A bus access mode of the second camera module 1002 in the standard slave SPI apparatus mode is described below by using FIG. 6 and FIG. 7 as an example. As shown in FIG. 6, in the standard slave SPI apparatus mode, the second camera module 1002 works in the standard slave SPI apparatus mode, and if the first camera module 1001 sets the first data bit after the SCK starts to 0, the second camera module 1002 may read, under control of the first camera module 1001, data transmitted on the data line (SDA or SDI). As shown in FIG. 7, in the standard slave SPI apparatus mode, if the first camera module 1001 sets the first data bit after the SCK starts to 1, the second camera module 1002 may send data by using the data line (SDA or SDO) under control of the first camera module 1001. Therefore, when in the standard slave SPI apparatus mode, the second camera module 1002 may implement data transmission between the second camera module 1002 and the first camera module 1001 under control of the first camera module 1001.

Specifically, for the three-wire mode, a connection relationship between the first camera module 1001, the second camera module 1002, and the first sensor 1003 is shown in FIG. 11. When the first camera module 1001 drives the first chip select signal to the disable state and drives the second chip select signal to the enable state, if the first camera module 1001 sends a write indication bit by using the SDA, because the second camera module 1002 is in the standard slave mode, after receiving the write indication bit by using the SDA, the second camera module 1002 may send data by using the SDA in response to the write indication bit, and the first camera module 1001 may receive, by using the SDA, the data sent by the second camera module 1002. In this case, the first sensor 1003 is in the unselected state, and does not respond to the write indication bit transmitted by the SDA.

In addition, for the three-wire mode, when the first camera module 1001 drives the first chip select signal to the disable state and drives the second chip select signal to the enable state, if the first camera module 1001 sends a read indication bit by using the SDA and transmits data by using the SDA, because the second camera module 1002 is in the standard slave mode, the second camera module 1002 may receive the data by using the SDA in response to the read indication bit transmitted by the SDA. In addition, in this case, the first sensor 1003 is in the unselected state, and does not respond to the read indication bit transmitted by the SDA.

Figure 13:
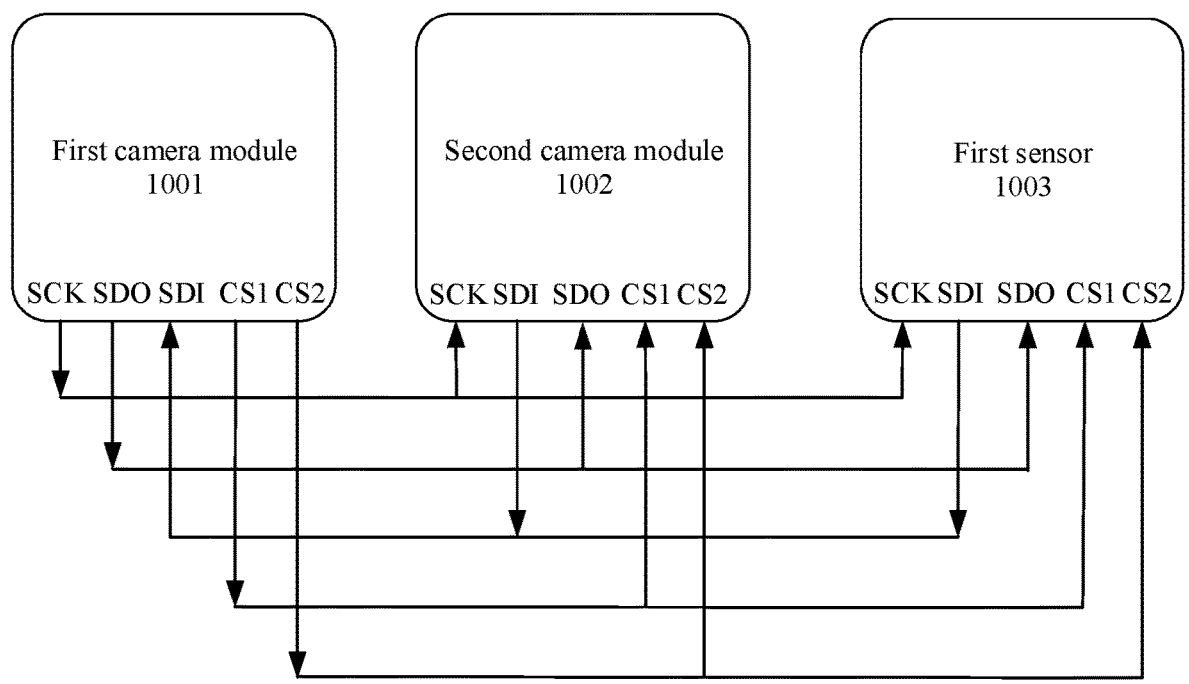
FIG. 13 is a schematic diagram of a connection relationship of another data transmission system according to an embodiment of this application.

For the four-wire mode, a connection relationship between the first camera module 1001, the second camera module 1002, and the first sensor 1003 is shown in FIG. 13. When the first camera module 1001 drives the first chip select signal to the disable state and drives the second chip select signal to the enable state, if the first camera module 1001 sends a write indication bit by using the SDO, because the second camera module 1002 is in the standard slave mode, the second camera module 1002 may receive the write indication bit by using the SDI, and send data by using the SDO in response to the write indication bit, and the first camera module 1001 may receive, by using the SDI, the data sent by the second camera module 1002 by using the SDO. In addition, in this case, the first sensor 1003 is in the unselected state, and does not respond to the write indication bit sent by the first camera module 1001 by using the SDO.

In addition, as shown in FIG. 13, when the first camera module 1001 drives the first chip select signal to the disable state and drives the second chip select signal to the enable state, if the first camera module 1001 sends a read indication bit by using the SDO and sends data by using the SDO, because the second camera module 1002 is in the standard slave mode, the second camera module 1002 may receive the read indication bit by using the SDI, and read the data by using the SDI in response to the read indication bit. In addition, in this case, the first sensor 1003 is in the unselected state, and does not respond to the read indication bit sent by the first camera module 1001 by using the SDO.

It should be understood that, in the unselected mode, for the three-wire mode, a connection relationship between the first camera module 1001, the second camera module 1002, and the first sensor 1003 is shown in FIG. 11. In addition, in the unselected mode, for the four-wire mode, a connection relationship between the first camera module 1001, the second camera module 1002, and the first sensor 1003 is shown in FIG. 13.

In some embodiments, the dual-chip select logic determining result may be represented by Table 1.

As shown in FIG. 2 or Table 1, when a state of the first chip select signal is the enable state and a state of the second chip select signal is the disable state, the second camera module 1002 may be enabled to enter the data listening mode. When the state of the first chip select signal is the disable state and the state of the second chip select signal is the enable state, the second camera module 1002 may be enabled to enter the standard slave SPI apparatus mode. When the state of the first chip select signal is the disable state and the state of the second chip select signal is the disable state, the second camera module 1002 may be enabled to enter the unselected mode.

In addition, the first camera module 1001 may further output the first chip select signal and the second chip select signal to the first sensor 1003, to control, by using the first chip select signal and the second chip select signal, whether to enable the first sensor 1003. Therefore, the first camera module 1001 may enable, by using a combination of the enable state or the disable state of the first chip select signal and the enable state or the disable state of the second chip select signal, the first sensor 1003 to be in a plurality of work modes. For example, the plurality of work modes of the first sensor 1003 may include the data listening mode, the standard slave SPI apparatus mode, and the unselected mode. Alternatively, the plurality of work modes of the first sensor 1003 may include the standard slave SPI apparatus mode and the unselected mode.

For example, when the second camera module 1002 is in the listening mode, the first sensor 1003 is in the standard slave SPI apparatus mode or the unselected mode, and/or when the first sensor 1003 is in the listening mode, the second camera module 1002 is in the standard slave SPI apparatus mode or the unselected mode. For the work modes of the first sensor 1003, refer to the descriptions of the work modes of the second camera module 1002 in this application.

With reference to the descriptions of the work modes of the second camera module 1002 and the work modes of the first sensor 1003, when the first camera module 1001 drives the first chip select signal to the enable state and drives the second chip select signal to the disable state, the first camera module 1001 may control the first sensor 1003 to send data by using the data line, and receive, by using the data line, the data sent by the first sensor 1003. In this case, because the second camera module 1002 is in the data listening mode, the second camera module 1002 may receive the data by using the data line. Therefore, when the first camera module 1001 drives the first chip select signal to the enable state and drives the second chip select signal to the disable state, the first camera module 1001 and the second camera module 1002 can simultaneously receive the data sent by the first sensor 1003, thereby improving data transmission efficiency between the master SPI apparatus and the plurality of slave SPI apparatuses.

When the first camera module 1001 includes one of the plurality of camera modules of the photographing device, the second camera module 1002 includes another camera module of the photographing device, and the first sensor 1003 includes a gyroscope sensor of the photographing device, the plurality of camera modules including the first camera module 1001 and the second camera module 1002 can simultaneously receive gyroscope information (or referred to as data of the gyroscope sensor) sent by the gyroscope sensor. Herein, the gyroscope information may include data such as X/Y/Z tri-axis angular velocity information of the gyroscope. A camera module supporting optical image stabilization may calculate, based on the X/Y/Z tri-axis angular velocity information of the gyroscope, a shake of a hand during photographing, and control a lens by using a motor (for example, a motor integrated inside the camera module) to implement shake compensation. With the data transmission method, efficiency of receiving the gyroscope information by the plurality of camera modules can be improved, thereby optimizing an optical image stabilization effect.

In addition, the first camera module 1001 should avoid driving the first chip select signal to the enable state and driving the second chip select signal to the enable state at the same time. If the first camera module 1001 incorrectly drives the first chip select signal and the second chip select signal to the enable state at the same time, the second camera module 1002 may determine that a drive state is incorrect and does not respond to a bus operation.

In a possible example, the second camera module 1002 may switch its data port, to implement switching between the connection relationships shown in FIG. 12 and FIG. 13 without changing a connection line between chips. The switching of the data port includes but is not limited to switching the data port from a unidirectional data port to a bidirectional data port, switching a transmit port to a receive port, or switching a receive port to a transmit port.

When CS1=0 & CS2=1, or when CS1 and CS2 are in the preset state combination (for example, the state combination corresponding to the data listening mode of the second camera module 1002), if a transmit port of the second camera module 1002 is connected to a receive port of the first camera module 1001 by using a first data line (or in other words, a transmit port of the second camera module 1002 is connected to a receive port of the first camera module 1001 and a transmit port of the first sensor 1003 by using a first data line), and a receive port of the second camera module 1002 is connected to a transmit port of the first camera module 1001 by using a second data line (or in other words, a receive port of the second camera module 1002 is connected to a transmit port of the first camera module 1001 and a receive port of the first sensor 1003 by using a second data line), in response to CS1 and CS2, the second camera module 1002 may switch the transmit port of the second camera module 1002 to the receive port (or in other words, the second camera module 1002 switches the SDO of the second camera module 1002 to the SDI), and switch the receive port of the second camera module 1002 to the transmit port (or in other words, the second camera module 1002 switches the SDI of the second camera module 1002 to the SDO), to obtain the connection relationship shown in FIG. 12. In this case, the receive port of the second camera module 1002 is connected to the receive port of the first camera module 1001, and the transmit port of the second camera module 1002 is connected to the transmit port of the first camera module 1001.

In addition, when CS1≠0 or CS2≠1, or when CS1 and CS2 are in a preset state combination (for example, any combination other than the state combination corresponding to the data listening mode of the second camera module 1002), if the receive port of the second camera module 1002 is connected to the receive port of the first camera module 1001, and the transmit port of the second camera module 1002 is connected to the transmit port of the first camera module 1001, in response to CS1 and CS2, the second camera module 1002 may switch the receive port of the second camera module 1002 to the transmit port (or in other words, the second camera module 1002 switches the SDI of the second camera module 1002 to the SDO), and switch the transmit port of the second camera module 1002 to the receive port (or in other words, the second camera module 1002 switches the SDO of the second camera module 1002 to the SDI), to obtain the connection relationship shown in FIG. 13.

With reference to FIG. 9, the following describes a manner in which the second camera module 1002 performs data port switching. It should be understood that the second camera module 1002 may include components such as a circuit, a camera, and a motor. The circuit may be configured to receive and/or send data based on the chip select signals by using the SPI protocol. The camera may be configured to capture images or videos. The motor may be configured to perform shake control and/or auto focus on the camera.

As shown in FIG. 9, the circuit may include components such as an SPI controller, an SPI control logic unit (or referred to as an SPI control logic circuit), an SPI data receiving/sending switching unit (or referred to as an SPI data receiving/sending switching circuit), and an SPI data port (or referred to as a data port).

For example, the SPI controller may be configured to: when the first camera module 1001 obtains first sensor data by using the SPI protocol, control the SPI data port to obtain the first sensor data. The SPI data port is configured for the second camera module 1002 to perform SPI protocol communication with the first camera module 1001 and/or the first sensor 1003. The first camera module 1001 is a master SPI device, and the second camera module 1002 and the first sensor 1003 are slave SPI devices.

Specifically, the SPI controller may be configured to process data that is to be sent, or configured to process data received by using the data line. For example, the SPI controller may include a sending module and a receiving module. The sending module may be configured to process and send, to the transmit port, data that is to be sent, and the receiving module may be configured to receive and process data from the receive port. The SPI controller may further control receiving and/or sending of data based on a work mode of the second camera module 1002. For example, when the second camera module 1002 is in the data listening mode, the SPI controller may control the SPI data port not to transmit, to the transmit port, data that is to be sent. For another example, when the second camera module 1002 is in the unselected mode, the SPI controller may control the SPI data port not to transmit, to the transmit port, data that is to be sent, and control the SPI data port not to receive data from the data line by using the receiving module.

The SPI control logic unit may receive the first chip select signal and the second chip select signal, and determine a dual-chip select logic determining result based on the first chip select signal and the second chip select signal. The determining result may be shown in FIG. 2 or Table 1. The SPI control logic unit may be further configured to output the logic determining result to the SPI controller, to indicate a work mode of the second camera module 1002. The SPI control logic unit may be further configured to configure a transmission direction of the SPI data port based on the logic determining result. The SPI control logic unit may be further configured to control the SPI data receiving/sending switching unit to connect the SPI data port and the sending module and/or the receiving module in the SPI controller.

The SPI data receiving/sending switching unit may be configured to connect the SPI data port and the sending module in the SPI controller under control of the SPI control logic unit, to form a transmit channel. The transmit channel may be configured to send data to the SDO. The SPI data receiving/sending switching unit may be further configured to connect the SPI data port and the receiving module in the SPI controller under control of the SPI control logic unit, to form a receive channel. The receive channel may be configured to receive data from the SDI.

For example, the circuit may include at least one SPI data port. When a quantity of SPI data ports is one, the second camera module 1002 supports only the three-wire mode. When the quantity of SPI data ports is two or more, the second camera module 1002 may support the three-wire mode and the four-wire mode.

For example, the SPI data port includes an SPI data port 1 and an SPI data port 2. During port switching, for the three-wire mode, the SPI control logic unit may switch the SPI data port 1 (or the data port 2) to a bidirectional data port. Specifically, the SPI control logic unit may configure, by using a configuration interface 1, a transmission direction of the SPI data port 1 (or the data port 2) to be bidirectional transmission, and control, by using a configuration interface 2, the SPI data port 1 (or the data port 2) to connect to the sending module and the receiving module of the SPI controller.

For example, the SPI data port includes an SPI data port 1 and an SPI data port 2. During port switching, for the four-wire mode, when CS1=0 & CS2=1, or when CS1 and CS2 are in a preset state combination (for example, the state combination corresponding to the data listening mode of the second camera module 1002), the SPI control logic unit may configure transmission directions of the SPI data port 1 and data port 2 by using the configuration interface 1.

For example, in the four-wire mode, when CS1≠0 or CS2≠1, or when CS1 and CS2 are in a preset state combination (for example, any combination other than the state combination corresponding to the data listening mode of the second camera module 1002), if the transmission direction of the SPI data port 1 is a transmit direction, and the transmission direction of the SPI data port 2 is a receive direction, that is, the SPI data port 1 is a transmit port (in this case, a data line connected to the SPI data port 1 is the SDO), and the SPI data port 2 is a receive port (in this case, a data line connected to the SPI data port 2 is the SDI), when CS1=0 & CS2=1, or when CS1 and CS2 are in a preset state combination (for example, the state combination corresponding to the data listening mode of the second camera module 1002), the SPI control logic unit may configure the transmission direction of the SPI data port 1 to the receive direction by using the configuration interface 1, and configure the transmission direction of the SPI data port 2 to the transmit direction by using the configuration interface 1, that is, the SPI control logic unit configures the SPI data port 1 to the receive port by using the configuration interface 1 (in this case, a data line connected to the SPI data port 1 is the SDI), and configure the SPI data port 2 to the transmit port by using the configuration interface 1 (in this case, a data line connected to the SPI data port 2 is the SDO). In addition, the SPI control logic unit further controls, by using the configuration interface 2, the SPI data receiving/sending switching unit to connect the SPI data interface 1 to the receiving module of the SPI controller, to form a receive channel, and the SPI control logic unit further controls, by using the configuration interface 2, the SPI data receiving/sending switching unit to connect the SPI data interface 2 to the sending module of the SPI controller, to form a transmit channel. So far, the switching between the transmit port and the receive port is completed.

In addition, in the four-wire mode, when the states of CS1 and CS2 change from CS1=0 & CS2=1 to CS1≠0 or CS2≠1 (for example, CS1=1 or CS2=0), or when CS1 and CS2 change from one preset state combination (for example, the state combination corresponding to the data listening mode of the second camera module 1002) to another preset state combination (for example, any combination other than the state combination corresponding to the data listening mode of the second camera module 1002), if the transmission direction of the SPI data port 1 is a receive direction, and the transmission direction of the SPI data port 2 is a transmit direction, the SPI control logic unit may configure the transmission direction of the SPI data port 1 to be a transmit direction by using the configuration interface 1 (in this case, a data line connected to the SPI data port 1 is the SDO), and configure the transmission direction of the SPI data port 2 to be a receive direction by using the configuration interface 1 (in this case, a data line connected to the SPI data port 2 is the SDI). In addition, the SPI control logic unit further controls, by using the configuration interface 2, the SPI data receiving/sending switching unit to connect the SPI data interface 1 to the sending module of the SPI controller, to form a transmit channel, and the SPI control logic unit further controls, by using the configuration interface 2, the SPI data receiving/sending switching unit to connect the SPI data interface 2 to the receiving module of the SPI controller, to form a receive channel. So far, the switching between the transmit port and the receive port is completed.

For example, functions of some or all components of the SPI control logic unit, the SPI controller, the SPI data receiving/sending switching unit, or the SPI data port shown in FIG. 9 may be implemented by a chip, an integrated circuit, or a logic circuit. Each component of the circuit shown in FIG. 9 may be implemented in an integrated manner, a discrete manner, or by using a chip or a chip system including a plurality of chips.

Based on a same concept, this application further provides a circuit. The circuit may be connected to a second camera, to implement the functions shown in the second camera module 1002.

For example, the circuit may have a structure shown in FIG. 9. As shown in FIG. 9, the circuit may include components such as an SPI controller, an SPI control logic unit (or referred to as an SPI control logic circuit), an SPI data receiving/sending switching unit (or referred to as an SPI data receiving/sending switching circuit), and an SPI data port (or referred to as a data port).

The SPI controller may be configured to: when a first camera obtains first sensor data by using an SPI protocol, control the SPI data port to obtain the first sensor data. The SPI data port is configured for the second camera to perform SPI protocol communication with the first camera and/or a first sensor. The first camera is a master SPI device, and the second camera and the first sensor are slave SPI devices.

In a possible design, the SPI data port may send the obtained first sensor data to the second camera.

In a possible design, the SPI data port is connected to the first camera and the first sensor by using a data line.

In a possible design, the circuit further includes the SPI control logic unit, configured to receive a first chip select signal and a second chip select signal from the first camera. A combination of the first chip select signal and the second chip select signal is used to control whether to enable the second camera. When the first chip select signal is in an enable state and the second chip select signal is in a disable state, the SPI control logic circuit may control the SPI controller to control the SPI data port to receive data sent by the first sensor to the first camera on the data line.

In a possible design, the circuit further includes the SPI control logic unit, configured to receive a first chip select signal and a second chip select signal from the first camera. A combination of the first chip select signal and the second chip select signal is used to control whether to enable the second camera. When the first chip select signal and the second chip select signal are in a preset state combination, the SPI control logic circuit may control the SPI controller to control the SPI data port to receive data sent by the first sensor to the first camera on the data line.

In a possible design, the SPI control logic unit may further control the SPI controller to control the SPI data port to receive data sent by the first camera to the first sensor on the data line.

In a possible design, if a transmit port of the second camera is connected to a receive port of the first camera by using a first data line, a receive port of the second camera is connected to a transmit port of the first camera by using a second data line, the data line includes the first data line and the second data line, the transmit port of the second camera and the transmit port of the first camera are configured to send data, and the receive port of the second camera and the receive port of the first camera are configured to receive data, when the first chip select signal is in the enable state and the second chip select signal is in the disable state, or when the first chip select signal and the second chip select signal are in the preset state combination, the SPI control logic unit may further configure the transmit port to receive data transmitted on the data line.

In a possible design, the circuit further includes the SPI data receiving/sending switching circuit. The SPI controller may include a sending module and a receiving module. The sending module is configured to send data, and the receiving module is configured to receive data. When the first chip select signal is in the enable state and the second chip select signal is in the disable state, or when the first chip select signal and the second chip select signal are in the preset state combination, the SPI control logic unit may further control the SPI data receiving/sending switching circuit to connect the transmit port to the receiving module.

In a possible design, the SPI control logic unit may further configure the SPI data port to a bidirectional data port, and the bidirectional data port supports receiving and sending of data.

In a possible design, when the first chip select signal is in the enable state and the second chip select signal is in the disable state, or when the first chip select signal and the second chip select signal are in the preset state combination, the SPI control logic unit may further control the SPI controller not to send data in response to a first indication transmitted by the data line. The first indication is used to control sending of data.

In a possible design, when the first chip select signal is in the disable state and the second chip select signal is in the enable state, or when the first chip select signal and the second chip select signal are in a preset state combination, the SPI control logic unit may control the SPI controller to receive, through the SPI data port, a second indication transmitted on the data line. The SPI controller may control, in response to the second indication, the SPI data port to receive data transmitted on the data line. The second indication is used to control receiving of data.

In a possible design, when the first chip select signal is in the disable state and the second chip select signal is in the enable state, or when the first chip select signal and the second chip select signal are in a preset state combination, the SPI control logic unit may control the SPI controller to receive, through the SPI data port, a first indication transmitted on the data line. The SPI controller may control, in response to the first indication, the SPI data port to send data to the data line. The first indication is used to control sending of the data.

In a possible design, when the first chip select signal is in the disable state and the second chip select signal is in the disable state, or when the first chip select signal and the second chip select signal are in a preset state combination, the SPI control logic unit controls the SPI controller not to send data by using the data line and controls the SPI controller not to receive data by using the data line.

Based on a same concept, this application further provides a circuit. The circuit may be connected to a first camera, to implement the functions shown in the first camera module 1001.

Figure 14:
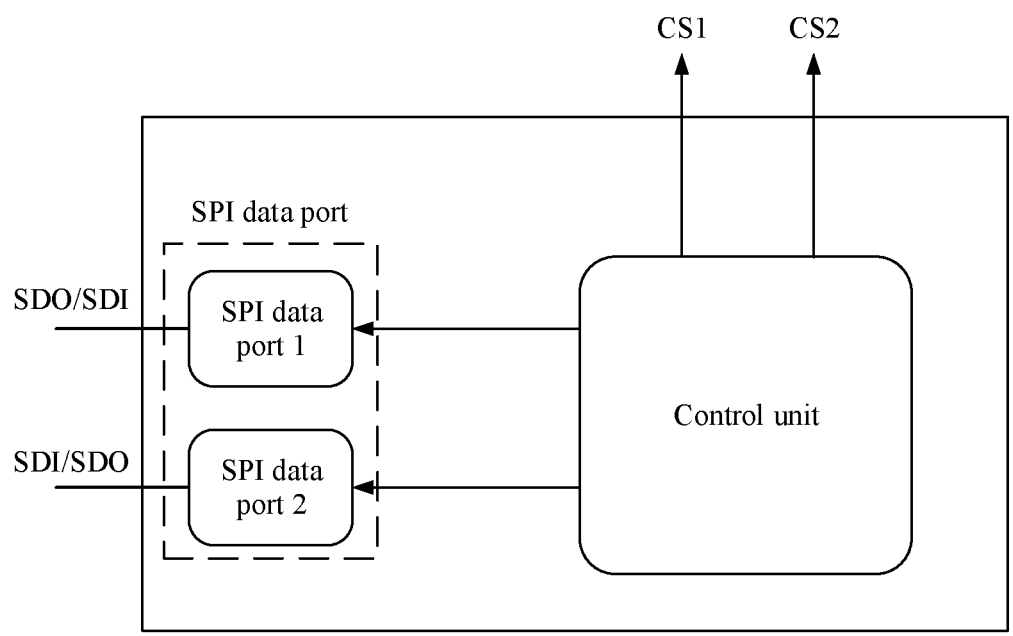
FIG. 14 is a schematic diagram of a structure of a circuit according to an embodiment of this application.

For example, the circuit may have a structure shown in FIG. 14. As shown in FIG. 14, the circuit may include components such as a control unit (or a control circuit) and an SPI data port (or referred to as a data port).

The SPI data port may be configured for the first camera module 1001 to obtain first sensor data by using an SPI protocol. The control circuit may be configured to control the second camera module 1002 to obtain the first sensor data by using the SPI protocol at the same time. The first camera module 1001 is a master SPI device, and the second camera module 1002 and the first sensor 1003 are slave SPI devices. The first sensor data comes from the first sensor 1003.

In a possible design, the SPI data port is connected to the second camera module 1002 and the first sensor 1003 by using a data line.

In a possible design, the control circuit may output a first chip select signal to the second camera module 1002 and the first sensor 1003, and output a second chip select signal to the second camera module 1002 and the first sensor 1003. A state combination of the first chip select signal and the second chip select signal is used to control whether to enable the second camera module 1002 and is used to control whether to enable the first sensor 1003.

In a possible design, when the first chip select signal is in an enable state and the second chip select signal is in a disable state, the control circuit may control the first sensor 1003 to send data by using the data line, and control the SPI data port to receive, by using the data line, the data sent by the first sensor 1003; and control the second camera module 1002 to receive, by using the data line, the data sent by the first sensor 1003 to the first camera module 1001.

In a possible design, when the first chip select signal and the second chip select signal are in a preset state combination (for example, a state combination corresponding to a data listening mode of the second camera module 1002), the control circuit may control the first sensor 1003 to send data by using the data line, and control the SPI data port to receive, by using the data line, the data sent by the first sensor 1003; and control the second camera module 1002 to receive, by using the data line, the data sent by the first sensor 1003 to the first camera module 1001.

In a possible design, the control circuit may further control the SPI data port to send data to the first sensor 1003 by using the data line, and control the second camera module 1002 to receive, by using the data line, the data sent by the first camera module 1001 to the first sensor 1003.

In a possible design, when the first chip select signal is in the enable state and the second chip select signal is in the disable state, or when the first chip select signal and the second chip select signal are in a preset state combination, the control circuit may control the SPI data port to send a first indication by using the data line. The first indication is used to control sending of data.

In a possible design, when the first chip select signal is in the enable state and the second chip select signal is in the disable state, or when the first chip select signal and the second chip select signal are in a preset state combination, the control circuit may control the SPI data port to send a first indication by using the data line. The first indication is used to control sending of data.

Based on a same concept, this application further provides a camera module. The camera module may include the first camera module 1001 or the second camera module 1002.

For example, the first camera module 1001 may include a circuit shown in FIG. 14, a motor, and a first camera. The circuit shown in FIG. 14 may be implemented by a motor drive IC, or as a component of the motor drive IC in the camera module.

The second camera module 1002 may include a circuit shown in FIG. 9, a motor, and a second camera. The circuit shown in FIG. 9 may be implemented by a motor drive IC, or as a component of the motor drive IC in the camera module.

When the first sensor includes a gyroscope sensor, the motors in the first camera module 1001 and the second camera module 1002 may be configured to obtain data of the gyroscope sensor by using the circuits, and perform shake control and/or auto focus on the cameras based on the data of the gyroscope sensor.

When the first camera module 1001 serves as a master SPI apparatus, the second camera module 1002 and the gyroscope sensor serve as slave SPI apparatuses, the first camera module 1001 may receive gyroscope information from the gyroscope sensor by using the data line when driving the first chip select signal to the enable state and driving the second chip select signal to the disable state, and at the same time, the second camera module 1002 may also receive the gyroscope information from the gyroscope sensor by using the data line, which is not like a conventional technology in which the first camera module 1001 first receives gyroscope data from the gyroscope sensor, and then the first camera module 1001 sends the gyroscope data to the second camera module 1002. Therefore, in this embodiment of this application, efficiency of receiving the gyroscope information by the camera module can be improved, and a shake compensation effect of the camera module can be improved.

Based on a same concept, this application further provides a terminal device. The terminal device may be a smartphone, a mobile smart device, a smart home device, a tablet computer, or the like, or may be a portable, pocket-sized, hand-held, computer built-in, or in-vehicle terminal device.

The terminal device may be a photographing device, and the photographing device may perform photographing by using a first camera module and/or a second camera module, and implement shake compensation and auto focus in a photographing process. The terminal device may further include an image processing chip, configured to obtain an image signal from the camera module, and process the image signal.

The terminal device may include some or all components of a circuit shown in FIG. 9, a circuit shown in FIG. 14, a first camera (or the first camera module 1001), and a second camera (or the second camera module 1002). The terminal device may further include a first sensor, and the first sensor includes a gyroscope sensor.

Alternatively, the terminal device may include a first camera module, a second camera module, and a gyroscope sensor configured to output gyroscope information. The first camera module, the second camera module, and the gyroscope sensor are connected by using a serial peripheral interface SPI. The first camera module serves as a master SPI apparatus, the gyroscope sensor and the second camera module serve as slave SPI apparatuses, and the first camera module and the second camera module simultaneously obtain the gyroscope information from the gyroscope sensor under control of SPI chip select signals sent by the first camera module. The image processing unit is configured to obtain an image signal from the first camera module and the second camera module.

In a possible design, both the first camera module and the second camera module are connected to the gyroscope sensor by using a data line. When the SPI chip select signals sent by the first camera module are in a preset state combination, the first camera module and the second camera module simultaneously obtain the gyroscope information from the gyroscope sensor.

In a possible design, both the first camera module and the second camera module are connected to the gyroscope sensor by using a data line. When the SPI chip select signals sent by the first camera module enable the second camera module and the gyroscope sensor, the first camera module and the second camera module simultaneously obtain the gyroscope information from the gyroscope sensor.

In a possible design, the second camera module and the gyroscope sensor simultaneously receive data from the first camera module.

The foregoing descriptions are merely example embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission system, comprising a master serial peripheral (SPI) apparatus, a first slave SPI apparatus, and a second slave SPI apparatus, wherein the master SPI apparatus is configured to:
   output a first chip select signal to the first slave SPI apparatus and the second slave SPI apparatus, and output a second chip select signal to the first slave SPI apparatus, wherein a combination of the first chip select signal and the second chip select signal is used to enable the first slave SPI apparatus, the first chip select signal is used to enable the second slave SPI apparatus, and the master SPI apparatus, the first slave SPI apparatus, and the second slave SPI apparatus are further connected by a data line; and
   in response to the master SPI apparatus driving the first chip select signal to an enable state and driving the second chip select signal to a disable state, control the second slave SPI apparatus to send data by using the data line, and receive, by using the data line, the data sent by the second slave SPI apparatus,
   wherein the second slave SPI apparatus is configured to, in response to
   the master SPI apparatus driving the first chip select signal to the enable state and driving the second chip select signal to the disable state, send the data by using the data line under control of the master SPI apparatus, and
   wherein the first slave SPI apparatus is configured to, in response to
   the master SPI apparatus driving the first chip select signal to the enable state and driving the second chip select signal to the disable state, receive, by using the data line, the data sent by the second slave SPI apparatus.

2. The data transmission system according to claim 1, wherein the data line comprises a first data line and a second data line,
   wherein a transmit port of the first slave SPI apparatus is connected to a receive port of the master SPI apparatus by using the first data line and a receive port of the first slave SPI apparatus is connected to a transmit port of the master SPI apparatus by using the second data line,
   wherein the transmit port of the first slave SPI apparatus and the transmit port of the master SPI apparatus are configured to send data, and the receive port of the first slave SPI apparatus and the receive port of the master SPI apparatus are configured to receive data, and
   wherein the first slave SPI apparatus is further configured to, in response to
   the master SPI apparatus driving the first chip select signal to the enable state and driving the second chip select signal to the disable state, switch the transmit port of the first slave SPI apparatus to the receive port, and switch the receive port of the first slave SPI apparatus to the transmit port.

3. The data transmission system according to claim 1, wherein the first slave SPI apparatus is further configured to:
   configure a data port of the first slave SPI apparatus to a bidirectional data port that supports receiving and sending of data.

4. The data transmission system according to claim 1, wherein the master SPI apparatus is specifically configured to,
   in response to the master SPI apparatus driving the first chip select signal to the enable state and driving the second chip select signal to the disable state, send a first indication by using the data line, wherein the first indication is used to control sending of data, and
   wherein the first slave SPI apparatus is further configured to, in response to
   the master SPI apparatus driving the first chip select signal to the enable state and driving the second chip select signal to the disable state, skip sending data in response to the first indication.

5. The data transmission system according to claim 4, wherein the master SPI apparatus is further configured to, in response to
   the master SPI apparatus driving the first chip select signal to the disable state and driving the second chip select signal to the enable state, send the first indication by using the data line and receive data from the first slave SPI apparatus by using the data line, wherein the first indication is used to control sending of data, and wherein the first slave SPI apparatus is further configured to, in response to the master SPI apparatus driving the first chip select signal to the disable state and driving the second chip select signal to the enable state, receive the first indication by using the data line and send the data by using the data line in response to the first indication.

6. The data transmission system according to claim 1, wherein the master SPI apparatus is further configured to, in response to the master SPI apparatus driving the first chip select signal to the disable state and driving the second chip select signal to the enable state, send a second indication and data by using the data line, wherein the second indication is used to control receiving of data, and wherein the first slave SPI apparatus is further configured to, in response to the master SPI apparatus driving the first chip select signal to the disable state and driving the second chip select signal to the enable state, receive the second indication by using the data line and receive the data by using the data line in response to the second indication.

7. The data transmission system according to claim 1, wherein the first slave SPI apparatus is further configured to, in response to the master SPI apparatus driving the first chip select signal to the disable state and driving the second chip select signal to the disable state, skip sending data by using the data line, and skip receiving data by using the data line.

8. The data transmission system according to claim 1, wherein the master SPI apparatus is a first camera, the first slave SPI apparatus is a second camera, and the second slave SPI apparatus is a sensor.

9. The data transmission system according to claim 8, wherein the sensor is a gyroscope sensor.

10. A chip comprising a serial peripheral interface (SPI) control logic circuit, an SPI controller, and an SPI data port, wherein the SPI control logic circuit is configured to receive a first chip select signal and a second chip select signal from a master SPI apparatus, wherein a combination of the first chip select signal and the second chip select signal is used to enable the chip, wherein the SPI data port is connected to the master SPI apparatus and a second slave SPI apparatus by a data line, and wherein the SPI control logic circuit is configured to:
in response to the master SPI apparatus driving the first chip select signal to an enable state and driving the second chip select signal to a disable state, control the SPI controller to receive, through the SPI data port, data sent by the second slave SPI apparatus on the data line.

11. The chip according to claim 10, wherein the SPI data port comprises a transmit port and a receive port, the transmit port is connected to a receive port of the master SPI apparatus by using the data line, the receive port is connected to a transmit port of the master SPI apparatus by using the data line, the transmit port is configured for the chip to send data to the data line, and the receive port is configured for the chip to receive data transmitted on the data line, and wherein the SPI control logic circuit is further configured to, in response to the master SPI apparatus driving the first chip select signal to the enable state and driving the second chip select signal to the disable state, configure the transmit port to receive data transmitted on the data line.

12. The chip according to claim 11, wherein the chip further comprises an SPI data receiving/sending switching circuit, and wherein the SPI control logic circuit is further configured to, in response to the master SPI apparatus driving the first chip select signal to the enable state and driving the second chip select signal to the disable state, control the SPI data receiving/sending switching circuit to connect the transmit port to the SPI controller.

13. The chip according to claim 10, wherein the SPI control logic circuit is further configured to:
configure the SPI data port to a bidirectional data port that supports receiving and sending of data.

14. The chip according to claim 10, wherein the SPI control logic circuit is further configured to, in response to the master SPI apparatus driving the first chip select signal to the enable state and driving the second chip select signal to the disable state, control the SPI controller to not send data in response to a first indication transmitted by the data line, wherein the first indication is used to control sending of data.

15. The chip according to claim 14, wherein the SPI control logic circuit is further configured to, in response to driving the master SPI apparatus driving the first chip select signal to the disable state and driving the second chip select signal to the enable state, control the SPI controller to receive, through the SPI data port, data transmitted on the data line, and wherein the SPI controller is further configured to, in response to the master SPI apparatus driving the first chip select signal to the enable state and driving the second chip select signal to the disable state, receive the first indication transmitted on the data line; and send data to the data line through the SPI data port in response to the first indication, wherein the first indication is used to control sending of data.

16. The chip according to claim 10, wherein the SPI control logic circuit is further configured to, in response to the master SPI apparatus driving the first chip select signal to the disable state and driving the second chip select signal to the enable state, control the SPI controller to receive, through the SPI data port, data transmitted on the data line, and wherein the SPI controller is further configured to, in response to the master SPI apparatus driving the first chip select signal to the enable state and driving the second chip select signal to the disable state, receive a second indication transmitted on the data line; and receive, in response to the second indication through the SPI data port, data transmitted on the data line, wherein the second indication is used to control receiving of data.

17. The chip according to claim 10, wherein the SPI control logic circuit is further configured to, in response to the master SPI apparatus driving the first chip select signal to the disable state and driving the second chip select signal to the disable state, control the SPI controller to not send data by using the data line, and control the SPI controller to not receive data by using the data line.

18. A camera system, wherein the camera system comprises a first camera, a second camera, and a first sensor; the first camera, the second camera, and the first sensor communicate with each other by using a serial peripheral interface (SPI) protocol; the first camera is a master SPI device, and the second camera and the first sensor are slave SPI devices; and, in response to the first camera and the second camera running simultaneously, the first camera is configured to obtain first sensor data by using the SPI protocol and the second camera obtains the first sensor data by using the SPI protocol at the same time.

19. The camera system according to claim 18, wherein the first camera is configured to:
   output a first chip select signal to the second camera and the first sensor, and output a second chip select signal to the second camera and the first sensor, wherein a state combination of the first chip select signal and the second chip select signal is used to control whether to enable the second camera and is used to control whether to enable the first sensor, and the first camera, the second camera, and the first sensor are further connected by a data line; and
   in response the first chip select signal being in an enable state and the second chip select signal being in a disable state, control the second camera to send data by using the data line, and receive, by using the data line, the data sent by the second camera,
wherein the first sensor configured to:
   in response to the first chip select signal being in the enable state and the second chip select signal being in the disable state, send data under control of the first camera by using the data line, and
wherein the second camera is configured to:
   in response to the first chip select signal being in the enable state and the second chip select signal being in the disable state, receive, by using the data line, the data sent by the first sensor to the first camera.

20. The camera system according to claim 18, wherein the first camera is further configured to:
   output a first chip select signal to the second camera and the first sensor, and output a second chip select signal to the second camera and the first sensor, wherein a state combination of the first chip select signal and the second chip select signal is used to control whether to enable the second camera and is used to control whether to enable the first sensor, and the first camera, the second camera, and the first sensor are further connected by using a data line; and
   in response to the first chip select signal and the second chip select signal being in a preset state combination, control the second camera to send data by using the data line, and receive, by using the data line, data sent by the second camera,
wherein the first sensor is configured to:
   in response to the first chip select signal and the second chip select signal being in the preset state combination, send data under control of the first camera by using the data line, and
wherein the second camera is configured to:
   in response to the first chip select signal and the second chip select signal being in the preset state combination, receive, by using the data line, the data sent by the first sensor to the first camera.

* * * * *